United States Patent [19]
Porter

[11] Patent Number: 5,576,911
[45] Date of Patent: Nov. 19, 1996

[54] CARTRIDGE LOCKING MECHANISM AND INTERFACE

[75] Inventor: Ryan S. Porter, Monument, Colo.

[73] Assignees: Sony Corporation, Tokyo, Japan; Sony Electronics Inc., Boulder, Colo.

[21] Appl. No.: 328,470

[22] Filed: Oct. 25, 1994

[51] Int. Cl.$^6$ ............................................. G11B 17/08
[52] U.S. Cl. ................................. 360/98.06; 360/92
[58] Field of Search ..................... 360/92, 98.06; 369/34, 36

[56] References Cited

U.S. PATENT DOCUMENTS

| | | | |
|---|---|---|---|
| 3,969,007 | 7/1976 | Lowry | 312/15 |
| 4,614,474 | 9/1986 | Yoshihiro Sudo | 414/281 |
| 4,701,900 | 10/1987 | Hasegawa et al. | 369/36 |
| 4,734,814 | 3/1988 | Fujino et al. | 360/133 |
| 4,755,978 | 7/1988 | Takizawa et al. | 369/37 |
| 4,817,079 | 3/1989 | Covington | 369/291 |
| 4,878,137 | 10/1989 | Yamashita et al. | 360/98.05 |
| 4,879,615 | 11/1989 | Teranishi et al. | 369/34 |
| 4,903,252 | 2/1990 | Tanaka et al. | 369/36 |
| 4,910,619 | 3/1990 | Suzuki et al. | 360/92 |
| 4,937,690 | 6/1990 | Yamashita et al. | 360/92 |
| 4,980,883 | 12/1990 | Mutou et al. | 369/291 |
| 4,984,108 | 1/1991 | Grant et al. | 360/92 |
| 4,998,232 | 3/1991 | Methile et al. | 369/36 |
| 5,010,536 | 4/1991 | Wanger et al. | 369/36 |
| 5,014,255 | 5/1991 | Wanger et al. | 369/36 |
| 5,040,159 | 8/1991 | Oliver et al. | 369/34 |
| 5,043,962 | 8/1991 | Wanger et al. | 369/36 |
| 5,056,073 | 10/1991 | Fitzgerald et al. | 369/36 |
| 5,317,554 | 5/1994 | Taylor et al. | 360/98.06 |

FOREIGN PATENT DOCUMENTS

| | | | |
|---|---|---|---|
| 0183856A1 | 6/1986 | European Pat. Off. | G11B 17/26 |
| 0227446A3 | 7/1987 | European Pat. Off. | G11B 15/68 |
| 3701 598 A1 | 4/1988 | Germany | G11B 33/04 |
| 3 192566 | 8/1991 | Japan | G11B 17/26 |
| 1170729 | 11/1969 | Netherlands | A47B 81/00 |
| 2194510 | 3/1988 | United Kingdom | A47B 81/06 |
| 2 232 524 | 12/1990 | United Kingdom . | |

OTHER PUBLICATIONS

Stavely, et al. "A Rewritable Optical Disk Library System for Direct Secondary Storage" Hewlett–Packard Journal, Dec. 1990, pp. 6–13.

Dauner, et al. "Mechanical Design of an Optical Disk Autochanger" Hewlett–Packard Journal, Dec. 1990, pp. 14–23.

Oliver, et al. "Optical Disk Autochanger Servomechanism Design" Hewlett–Packard Journal, Dec. 1990, pp. 24–34.

Saldanha, et al. "Qualification of an Optical Disk Drive for Autochanger Use" Hewlett–Packard Journal, Dec. 1990, pp. 35–37.

*Primary Examiner*—John H. Wolff
*Attorney, Agent, or Firm*—Limbach & Limbach

[57] ABSTRACT

A disk magazine comprising a housing having a pair of walls connected in spaced relationship to define a storage chamber between them and having separators mounted within the storage chamber to form a plurality of cartridge slots. Cartridges are locked within the storage chamber by means of a plurality of spring members connected to at least one of the walls. Each spring member has a disk contacting end extending partially into the chamber such that, when a cartridge is positioned in one of the slots, the cartridge is clamped between a spring member and the opposing wall. A manual release tab allows for manual unlocking of the magazine for loading and unloading of cartridges. Automatic unlocking of the magazine occurs upon installation of the magazine into a cartridge storage and retrieval system.

19 Claims, 22 Drawing Sheets

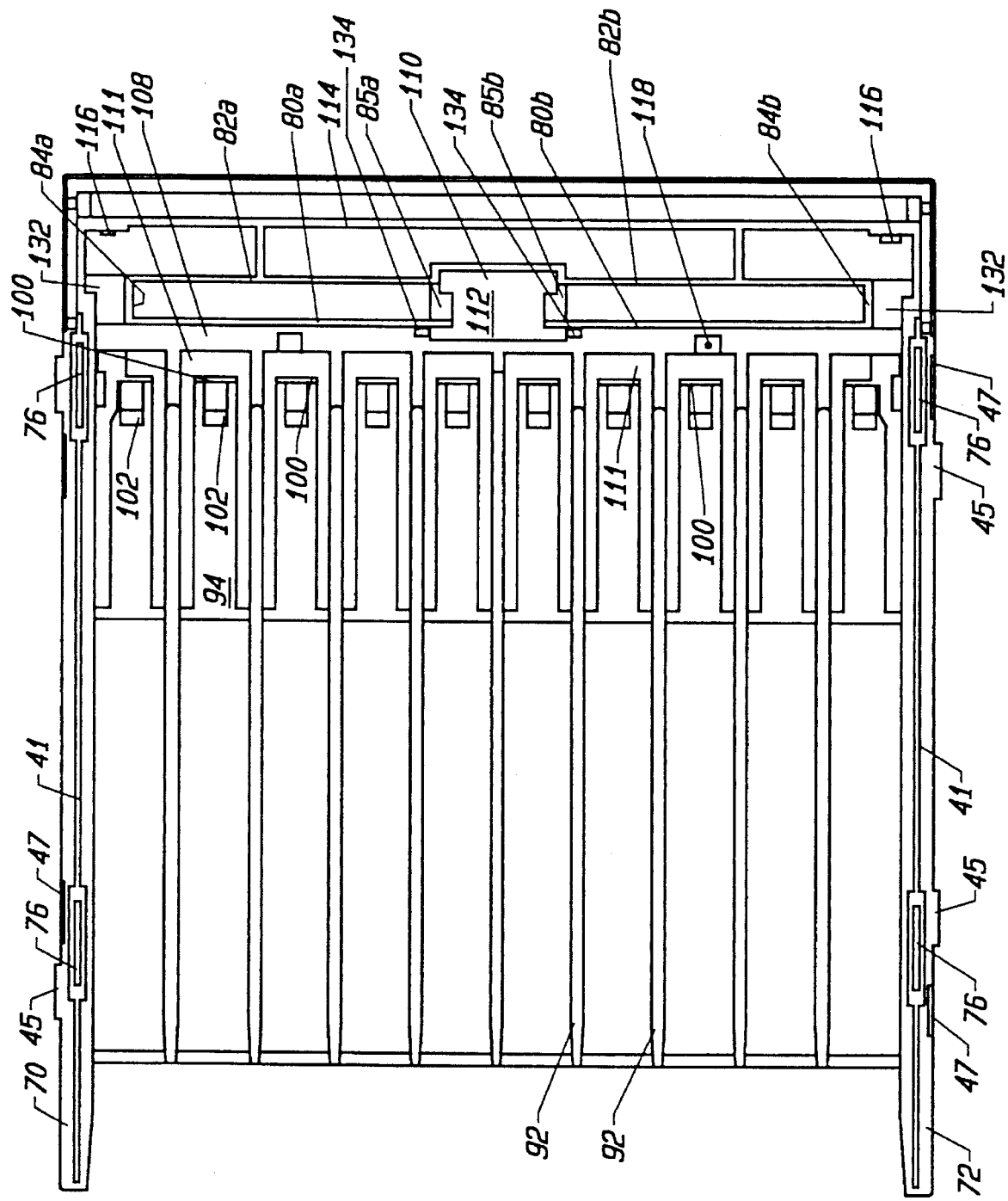

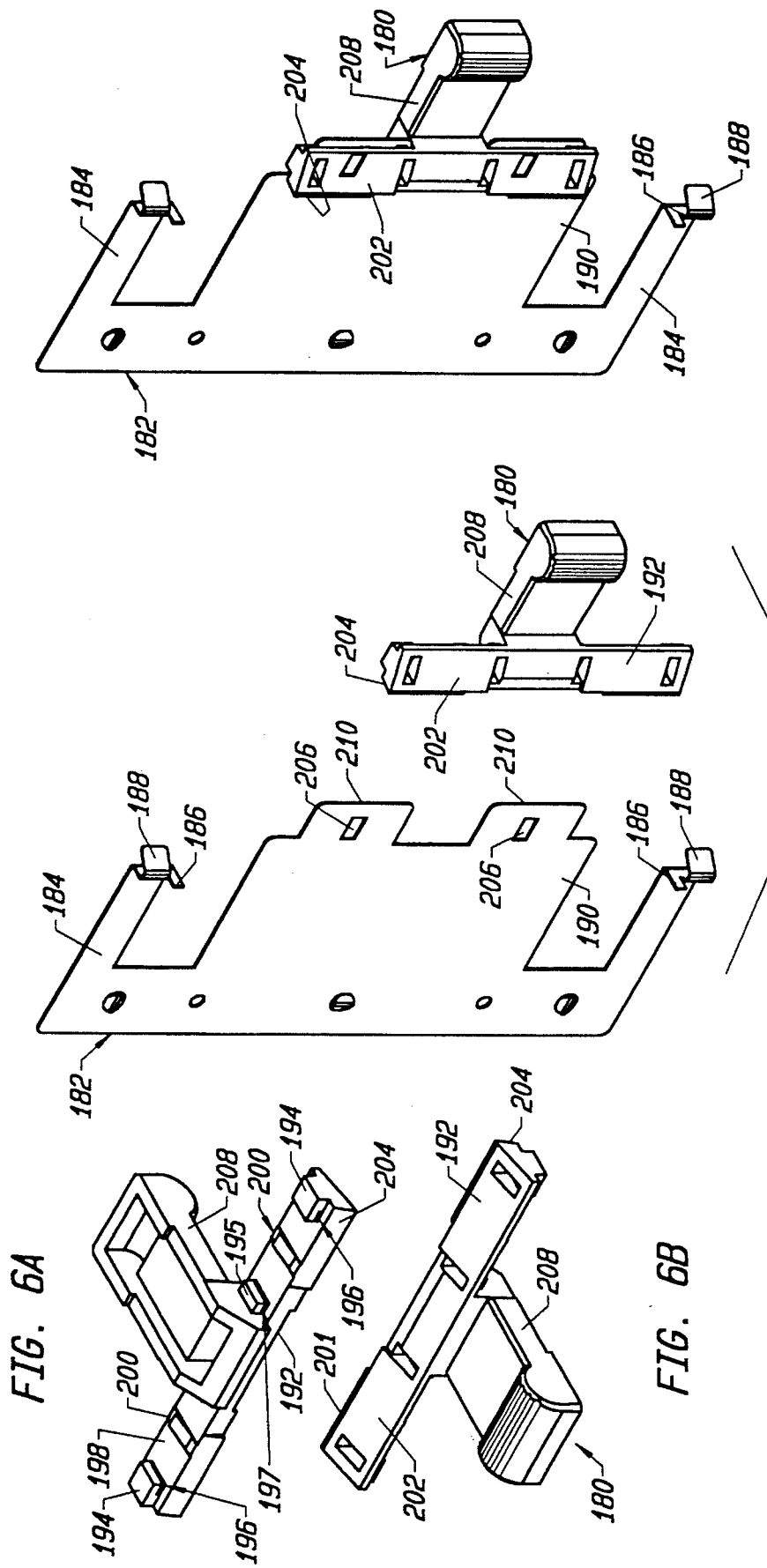

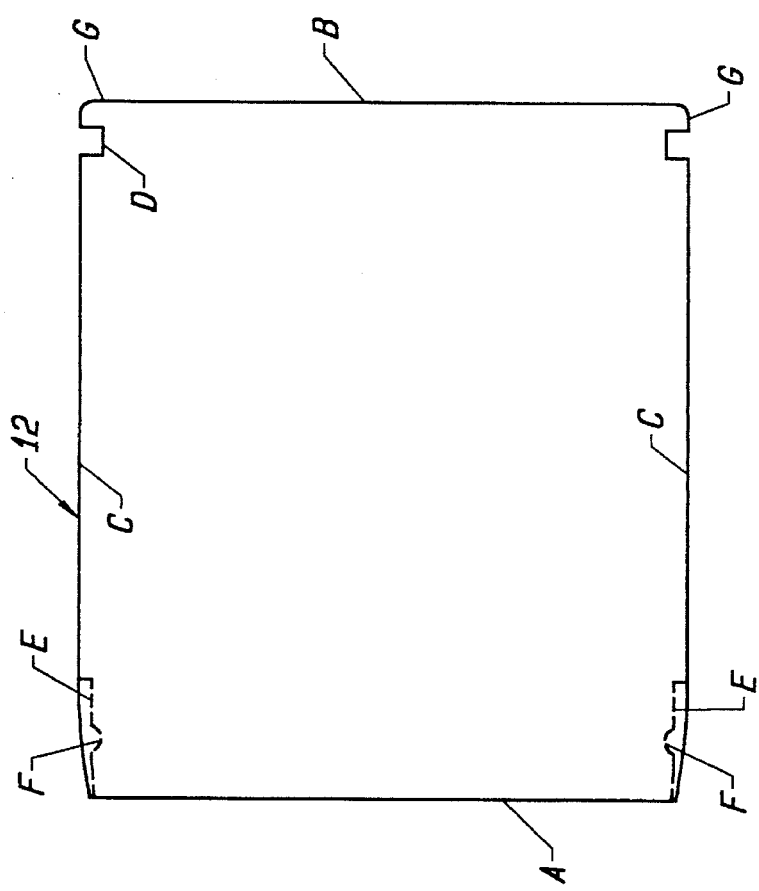
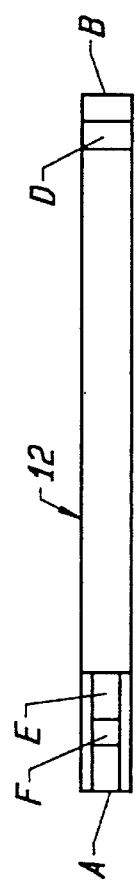
FIG. 9A
FIG. 9B

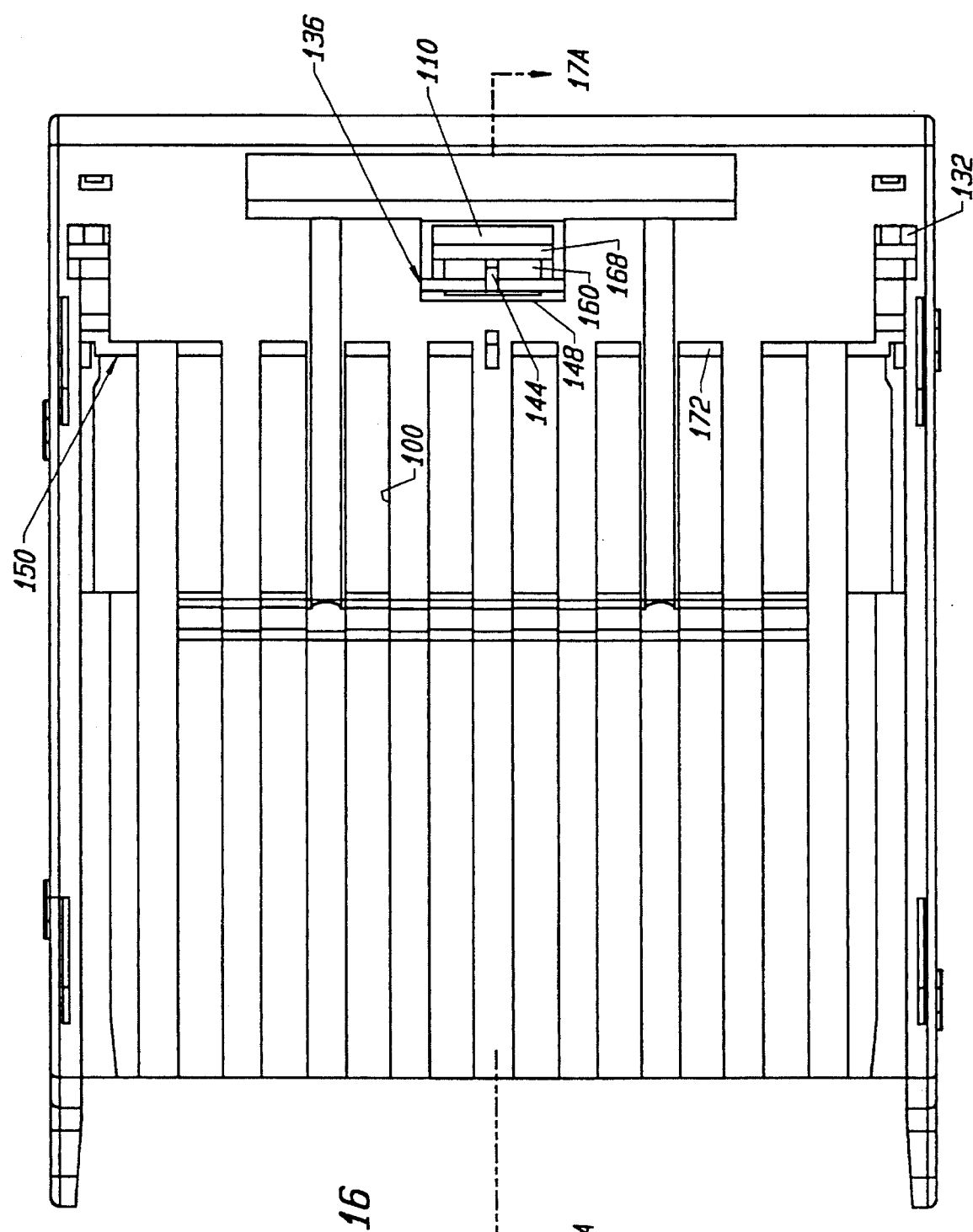

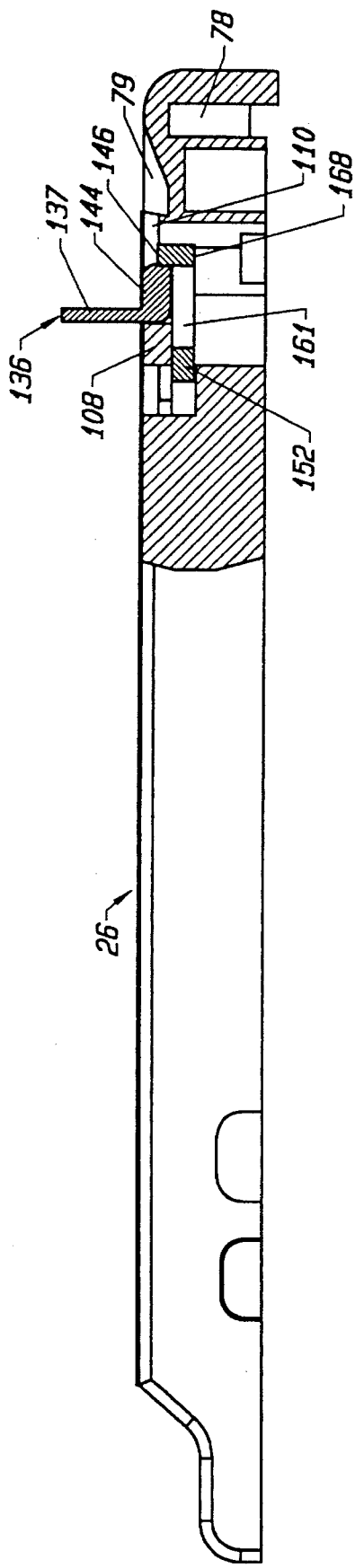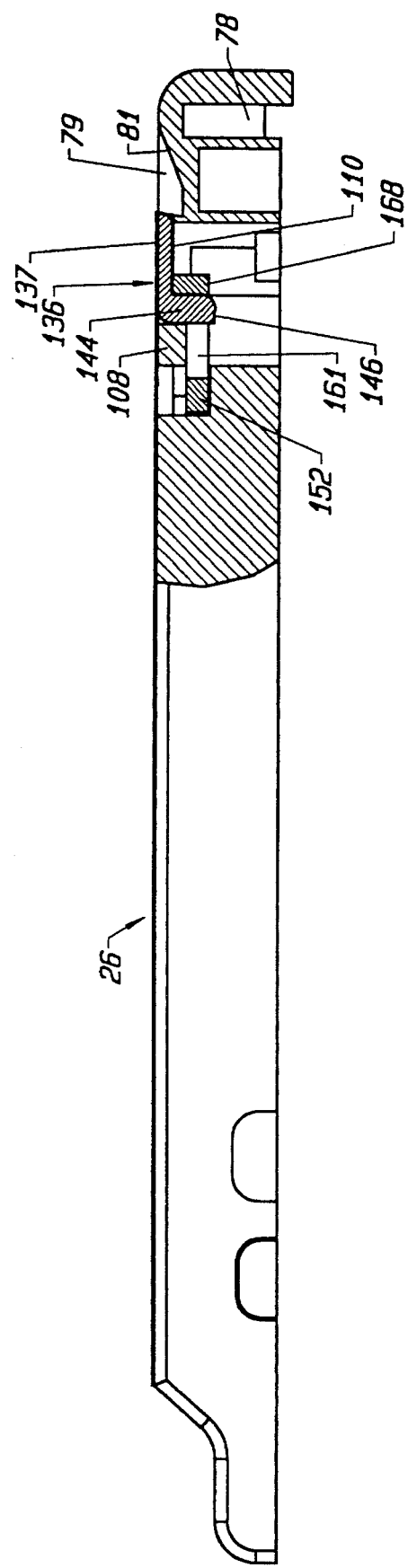

CARTRIDGE LOCKING MECHANISM AND INTERFACE

FIELD OF THE INVENTION

The present invention relates generally to apparatuses for storing media cartridges and specifically to devices for locking media cartridges within a magazine assembly.

BACKGROUND OF THE INVENTION

Optical disks, magnetic disks and magnetooptical disks are increasingly popular mediums for digitally storing information. Such disks are typically enclosed in a box shaped disk cartridge having apertures through which a laser light source or magnetic head can read (or write) to the spinning disk contained within the cartridge.

In certain large-scale disk cartridge storage and retrieval systems (sometimes referred to as "jukeboxes"), disk cartridges are stored in one or more racks in an array of storage slots. Commonly, the slots are oriented horizontally and are arranged in a vertical column such that horizontal disk cartridges sit, one on top of another, in the individual slots. Storage and retrieval systems may have one or more such columns of disk cartridge storage slots. This type of system includes a cartridge retrieval mechanism which is movable into position adjacent a slot. The mechanism includes apparatus for grasping a cartridge while in the slot, drawing it out from the slot, holding the cartridge in a sleeve, transporting it to a different location, such as a recording/reading/erasing station, and ejecting the cartridge into that location.

Cartridges of the type used in present jukebox systems have two large nearly square faces which correspond to the top and bottom of the disk, and four thin rectangular faces which surround the disk and connect the top face to the bottom face. The cartridge has a shutter which slidably covers an aperture in one of the large faces and which provides a port through which the disk is presented to the central processing unit. The shutter is slidable to expose the disk contained inside the cartridge, for reading from or writing to the disk.

A portion of the shutter is slidable over one of the four thin faces and includes a catch which is automatically engaged at the reading/writing station to slide the shutter to expose the disk. The thin faces that are perpendicular to the thin face having the shutter catch are slightly tapered (at their ends nearest to the shutter) towards the shutter. The opposite ends of those faces have small rectangular notches that are sometimes used for disk handling.

In some jukebox systems cartridges of this type are loaded into portable cartridge magazines which can be easily installed into the jukebox systems. In such systems, a user loads a number of desired cartridges into the magazine, and inserts the entire magazine inside the jukebox system. The cartridge retrieval system is equipped to remove a selected cartridge directly from the magazine, and to return it to the magazine after use.

Cartridge magazines are normally rectangular boxes which have an open side through which cartridges are removed and inserted by a user or a cartridge retrieval system. It is necessary to provide a means for securing the cartridges within the magazine to prevent cartridges from falling out of the magazine through the open side. It is also necessary to provide means by which the magazine may be unlocked to permit insertion and removal of cartridges by a user or a cartridge retrieval system.

In one existing magazine design, the cartridges are stacked with the notches on each cartridge aligned with the notches on the other cartridges. A spring loaded retractable crossbar is biased so as to be in a locking position in which it engages the notches on one side of the cartridges, thereby preventing them from falling from the magazine. During installation of the magazine inside a compatible jukebox, a device inside the jukebox engages with the cross-bar and displaces the crossbar out of the cartridge notches so that the cartridge retrieval system can remove selected cartridges from the magazine. When the magazine is removed from the jukebox, the cross-bar springs back to its resting position within the cartridge notches, thereby re-locking the magazine.

The above-described magazine design may present problems during manual loading and unloading of cartridges. For example, removal of the cross-bar from the notches during manual loading and unloading requires manually holding the cross-bar in the unlocked condition (against the spring force). This requires the use of two hands, one for holding the cross-bar and the other for loading or unloading cartridges.

Another problem presented by cartridge magazines involves the need for proper orientation of the cartridges within the magazine. As discussed above, cartridges are provided with shutters that are slidable to expose the disk inside the cartridge for writing to, or reading from, the disk. It is therefore essential to load a cartridge into the jukebox in an orientation which will allow the cartridge retrieval mechanism to properly orient the disk in a read/write location.

It is also desirable to have a cartridge magazine that is easily assembled and that requires a minimal number of parts.

Accordingly, it is an object of the present invention to provide a magazine having a device for automatically unlocking cartridges within the magazine upon insertion of the magazine into a jukebox device, and for automatically locking the magazine upon its removal from the jukebox device.

If is a further object of the invention to provide a magazine having a device for manually unlocking the magazine for manual loading and unloading of cartridges, and for maintaining the unlocked condition of the magazine until loading or unloading is completed.

Another object of the present invention is to provide a cartridge magazine having a feature which prevents disks from being improperly inserted into the magazine (i.e. with the shutter facing in the wrong direction).

Still another object of the present invention is to provide a cartridge magazine that is easily assembled.

SUMMARY OF THE INVENTION

The present invention is a disk magazine comprising a housing having a pair of walls connected in spaced relationship to define a disk storage chamber between them. Disk separators are mounted within the storage chamber to form a plurality of cartridge slots.

A plurality of spring members are connected to at least one of the walls. Each spring member has a cartridge contacting end extending partially into the chamber such that, when a cartridge is positioned in one of the slots, the cartridge is clamped between a spring member and the opposing wall.

In a preferred form of the invention, the magazine housing comprises five walls, surrounding the storage chamber, which are securely connected together without the use of fasteners or adhesives.

BRIEF DESCRIPTION OF THE DRAWINGS

FIG. 3C is a side elevation view of the interior side of the magazine side shown in FIG. 3A, with the cartridge lock and the manual release tab removed.

FIGS. 6A and 6B are perspective views of a release tab according the present invention.

FIGS. 6C and 6D are perspective views of a latch spring assembly of the jukebox of FIG. 1. In FIG. 6C the release tab and the latch spring are shown separated from each other and in FIG. 6D they are shown attached.

FIGS. 9A and 9B are a top plan view and a side elevation view, respectively, of a standard disk cartridge of a type which can be loaded into the magazine of the present invention.

FIG. 16 is a side elevational view of the exterior surface of the magazine side of FIG. 15 showing the cartridge lock and the manual release tab in their unlocked conditions.

FIG. 17A is a partial cross-sectional top view of a magazine side taken along the plane designated 17A—17A in FIG. 16, and showing the manual release tab pivoted to an unlocked position to move the cartridge lock to an unlocked position.

FIG. 17B is a cross-sectional top view taken along the plane designated 17B—17B in FIG. 13 and showing the positioning of the manual release tab when the cartridge lock is in the locked position.

DETAILED DESCRIPTION OF THE INVENTION

I. Structure

Figure 1:
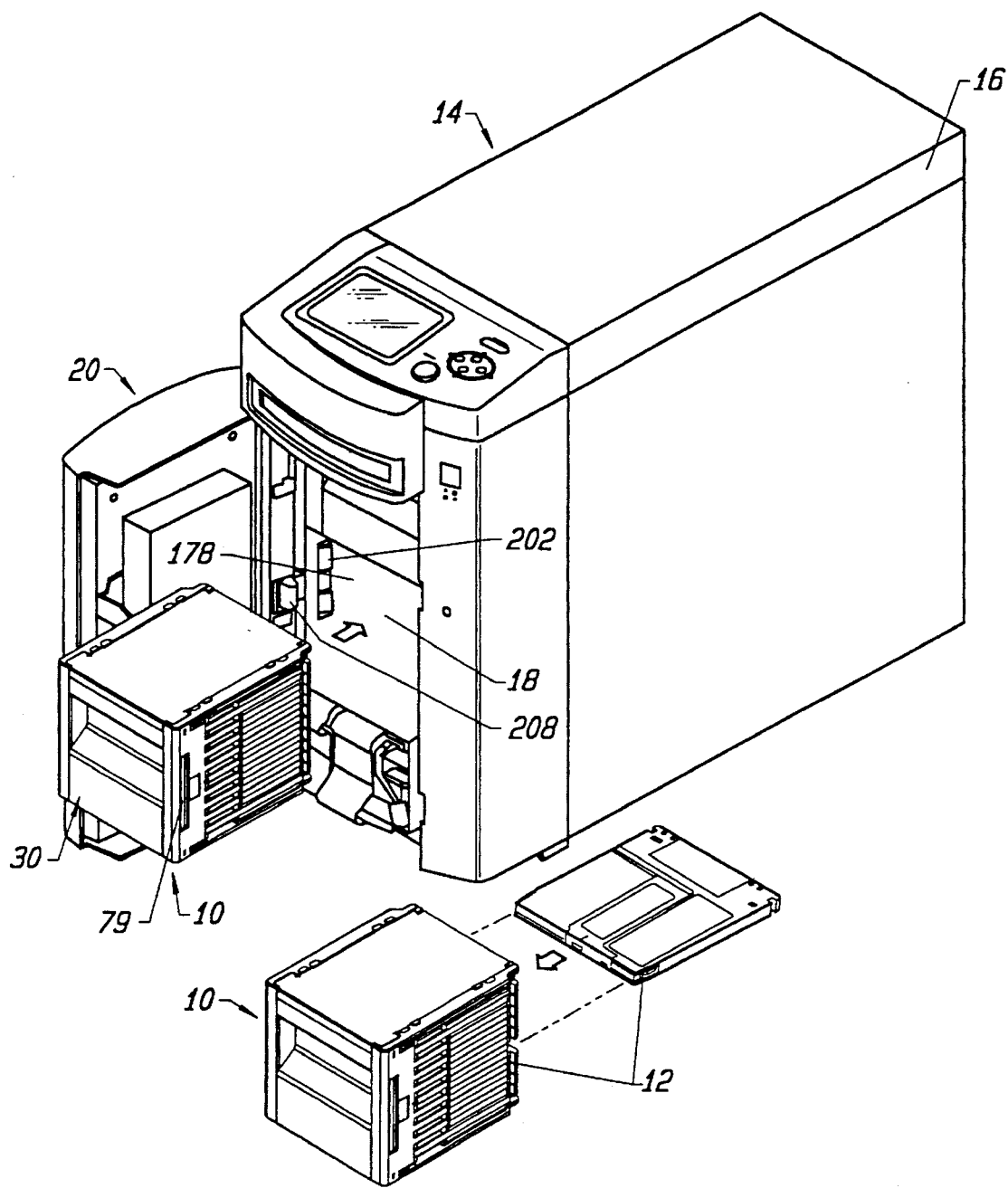
FIG. 1 is a perspective view of a jukebox of the type used with a magazine according to the present invention, showing the door to the jukebox open and further showing a magazine being installed in the jukebox and a cartridge being installed in a magazine.

Generally speaking (with reference to FIG. 1), the present invention is a magazine 10 for storing a plurality of optical disks 12. The magazine 10 is operable in connection with a disk "jukebox" such as the one designated 14 in FIG. 1 and which is normally interfaced with a personal or mainframe computer (not shown). Jukebox 14 includes a housing 16 having a chamber 18 and a door 20 hinged to the housing 16 and moveable between a closed position (not shown) and an open position to permit access to the chamber 18. Inside the jukebox housing 14 is a robotic disk retrieval system (not shown) which, upon receiving a command to do so, retrieves one of the disk cartridges 12 from the magazine 10 and moves it into a disk reading location (not shown). At the disk reading location, the information stored on the disk is retrieved from the disk by a magneto-optic read head (not shown).

(a) Magazine Housing

The preferred magazine 10 (shown in FIG. 2A) is comprised of top plate 22, bottom plate 24, a pair of magazine sides 26, and a front section 30. For the purposes of this discussion, terms such as "top," "bottom," "up," "down," etc. indicate the relative positions of the various described features when the magazine 10 is positioned with its bottom plate 24 horizontal and with the magazine sides 26 extending vertically upward from it. Terms such as "front" and "back" refer to the positioning of the various components when the magazine 10 is inside a jukebox such as the jukebox 14. The front section 30 of the magazine is therefore the portion which is exposed to the jukebox exterior when the magazine is inside the jukebox 14 and the door 20 to the jukebox is open as shown in FIG. 1. It should be appreciated, however, that the magazine of the present invention may be oriented in other ways as well. It should also be appreciated that, while the magazine of the present invention preferably comprise of a number of walls joined together to form a rectangular box, other types of appropriately rigid frameworks are within the scope of the present invention.

(i) Magazine Top and Bottom

Top plate 22 of the magazine 10 is a rectangular plate having a pair of parallel side edges 32, 34 and front and rear edges 36, 38 which are perpendicular to the side edges 32, 34. Extending from each of the side edges 32, 34 is a pair of rearwardly-directed foot projections 40. The rear corners (i.e., the corners formed between rear edge 38 and side edges 32 and 34) are cut out. A pair of rearwardly extending tabs 42 extend from the rear corners. Each of the tabs 42 angles slightly upwards from the top plate 22.

Bottom plate 24 is can be identical to the top plate 22, except that it does not have the rearwardly extending tabs 42 that plate 22 has. Foot projections 44, which are identical to the foot projections 40, extend from sides 46, 48 of the bottom plate 24.

The magazine top and bottom are preferably made from a stiff, flat, sheet metal, such as autoferritically coated carbon steel (1010/1020 CRS) having a thickness of approximately 1.0 mm.

(ii) Magazine Front Section

The magazine front section 30 is preferably a hollow rectangular box formed of injection-molded plastic. The front section 30 has a top surface 50, a pair of elongate side walls 52, and a front surface 54. Front surface 54 may have a recessed portion 56 and a plate 58 which covers part of recessed portion 56 and which may be used as a handle during installation of the magazine 10 into the jukebox unit 14 (See FIG. 1).

Each of the side walls 52 has an elongate rib 60 near front surface 54 of magazine front section 30. Also on each side 52, near the bottom, is a projection 62 which angles upwardly from the side 52. Top 50 of the magazine front section 30 has a pair of ends 64a, 64b which extend slightly laterally of the sides 52.

The magazine front section may be made from an injection molded plastic having good temperature stability and structure rigidity. One example of such a plastic is cycoloy C-2950 HF, a PC/ABS blend produced by General Electric.

(iii) Magazine Sides

The magazine sides are preferably formed of an injection molded plastic having low friction characteristics when used in sliding contact with plastics of the type used for standard ISO 5.25" cartridges. The plastic used should have temperature stability and mechanical rigidity. A preferred material for the magazine sides is a glass and PTFE filled PC, such as DFL-4034 EM FR MG, which is produced by LNP.

The magazine sides 26 will be described in two parts. First, the aspects of the magazine sides which relate to the fastener-free assembly of the magazine 10 will be described in order to facilitate an understanding of how the magazine sides are connected to the top and bottom plates 22, 24 and the magazine front section 30. The aspects of the magazine sides 26 which relate to the cartridge locking and magazine locking functions of the present invention will be described later.

Because each of the magazine sides 26 is identical to the other, a single set of reference numerals will be used to refer to the various components of the magazine sides.

Figures 2A, 2B:
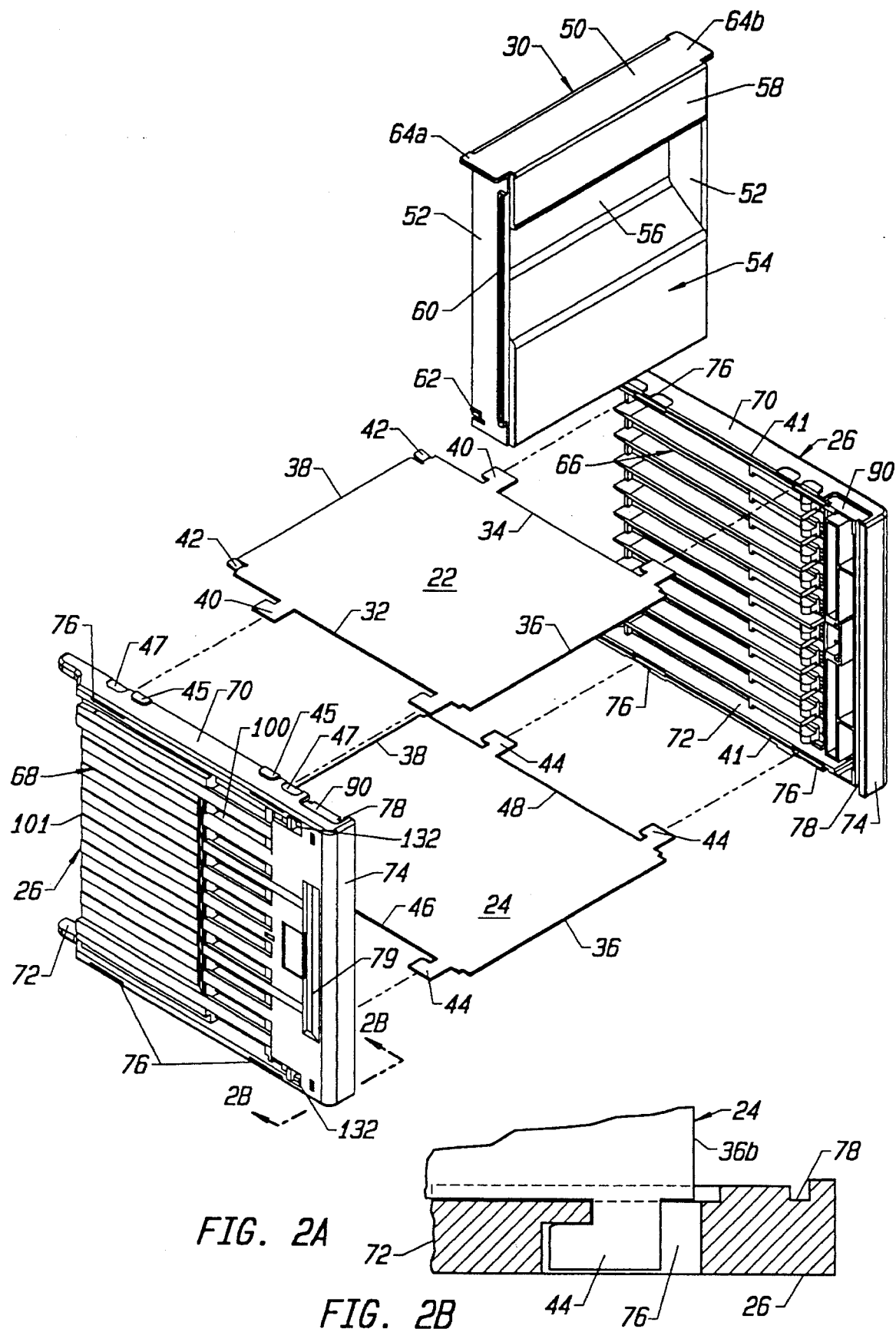
FIG. 2A is an exploded view of the magazine of FIG. 1.
FIG. 2B is a partial top section view of a side of the magazine of FIG. 1 taken along the plane designated 2B—2B in FIG. 2A and further showing a foot projection from a magazine bottom engaged with the magazine side.

Each of the magazine sides 26 has an interior side 66 and an exterior side 68 (see FIG. 2A). The terms "interior" and "exterior" refer to the direction in which the respective magazine sides 26 are facing when the magazine 10 is fully assembled. When the magazine 10 is assembled, the interior side 66 faces the interior of the magazine, and the exterior side 68 faces outwardly.

Magazine side 26 further has end plates 70 and a forward face 74. Through slots 76 extend laterally through the plates 70. The through slots 76 are L-shaped as shown in the cross-section view of FIG. 2B and are proportioned to receive the foot projections, 40, 44 of the top and bottom plates 22, 24, respectively, to allow the top and bottom plates 22, 24 to be securely fastened to the magazine sides 26.

Figure 3A:
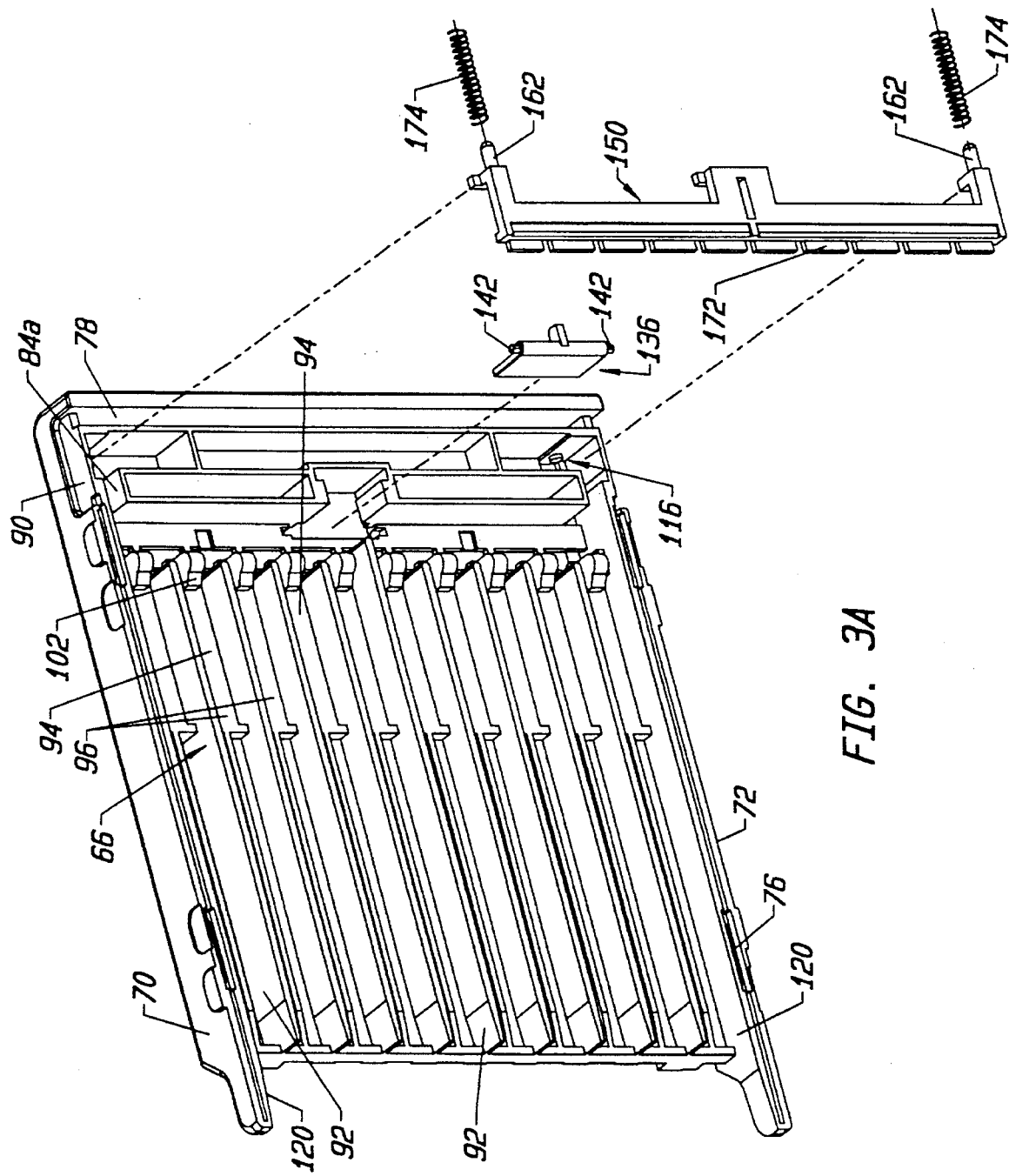
FIG. 3A is an exploded view of an interior side of a magazine side of the magazine of FIG. 1.
Figure 3B:
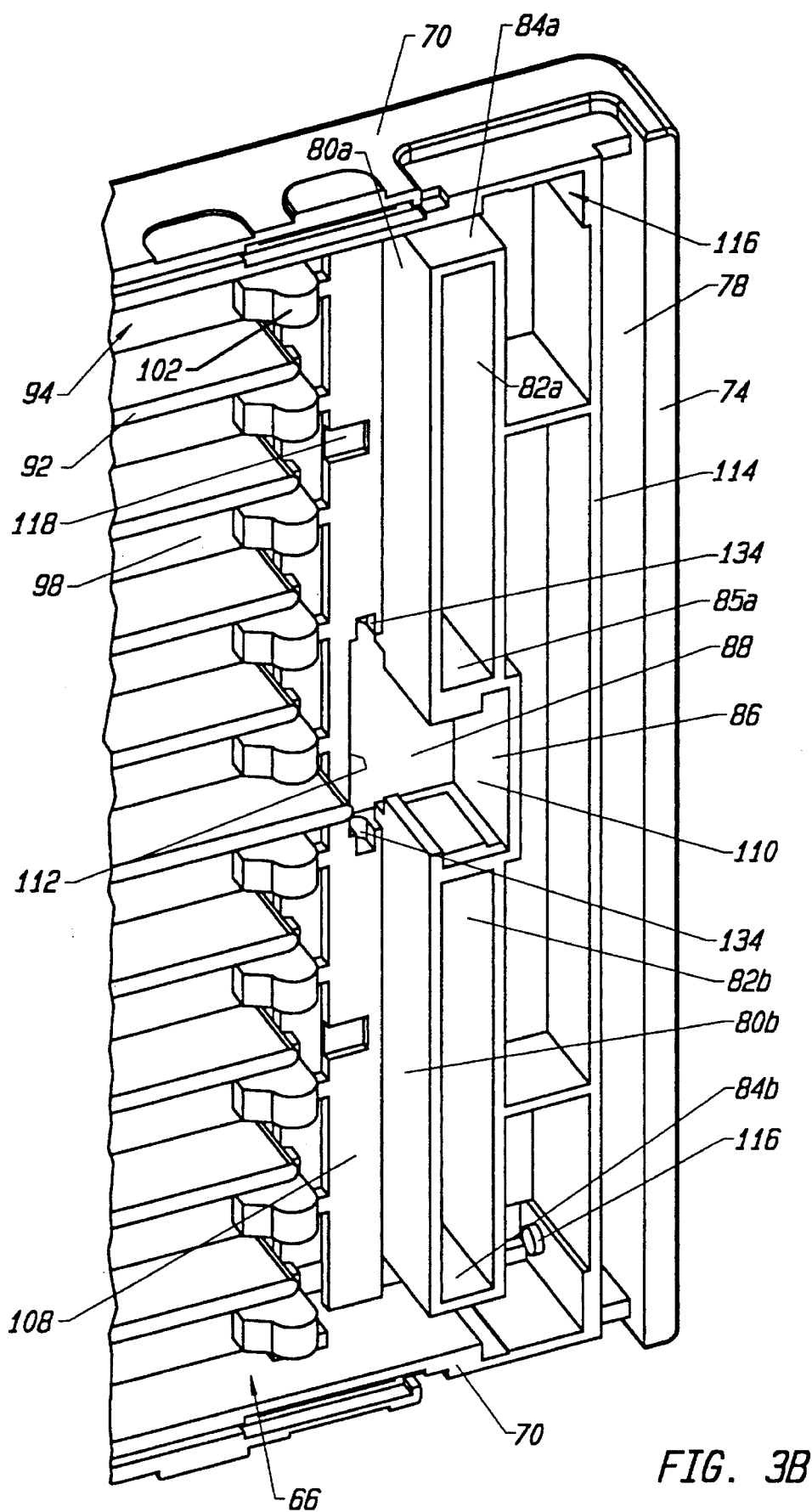
FIG. 3B is a perspective view of the front most portion of the interior side of the magazine side shown in FIG. 3A.

Referring to FIGS. 3A–3C, interior side 66 of the magazine side 26 includes a vertical slot 78 (best shown in FIG. 3B) which is proportioned to slidingly receive one of the ribs 60 formed on the magazine front section 30.

Grooves 41 are formed along each of the plates 70. When the magazine is assembled, these grooves receive the respective sides 32, 34 and 46, 48 of the magazine top and bottom 22, 24 (see FIG. 2A).

Formed within interior side 66 of the magazine side are a plurality of internal walls designated 80a, 80b, 82a, 82b, 84a, 84b, 86 which are joined to form a substantially rectangular structure. A gap 88 is formed between the structural walls 80a and 80b. The structural walls are positioned on the interior side 66 of the magazine side such that, as the magazine front is joined to the magazine sides 26 (i.e. by sliding the ribs 60 into the vertical slots 78), the projections 62 (FIG. 2A) on the magazine front section 30 deflect against and then snap beneath the internal walls 84b to secure the magazine sides 26 to the magazine front section 30.

When the magazine front section 30 and magazine sides 26 are joined together, the ends 64a, 64b on top 50 of magazine front section 30 rest within recesses 90 formed on upper plate 70 of each magazine side 26. Moreover, when the magazine 10 is assembled, the vertical walls 52 of the magazine front section 30 abut the forward edges 36 of the top and bottom plates 22, 24 and thus prevent the top and bottom plates 22, 24 from sliding forward. This is needed to prevent the foot projections 44, 40 from disengaging from their respective L-shaped through slots 76 (see FIG. 2B) on the magazine sides 26.

Referring again to FIG. 3A, the interior portion 66 of each magazine side a has a plurality of spaced shelves 92 extending parallel to the upper and lower plates 70. Each of the shelves 92 will support one side C (see FIG. 11) of a disk cartridge (designated A in FIG. 11). In other words, when the magazine 10 is fully assembled, a disk cartridge may be inserted into the magazine (through the back of the magazine, which is open) and positioned with one of its sides resting on a shelf 92 in one magazine side 26 and with its opposite side resting on another shelf 92 in the other magazine side.

Figure 12:
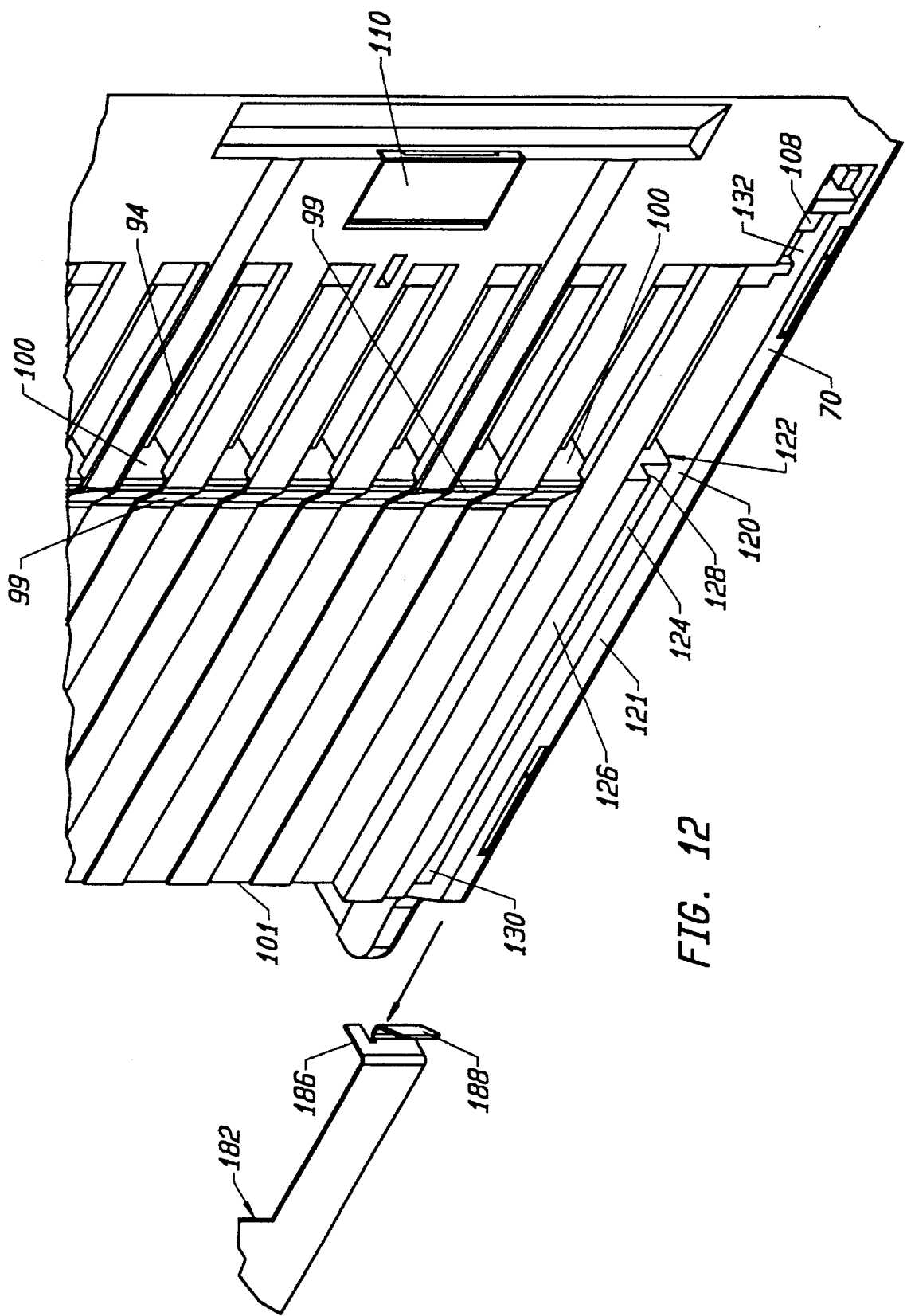
FIG. 12 is a partial perspective view of an exterior surface of the magazine side of FIG. 10 and the latch spring FIGS. 6C and 6D.

Spaced on either side of each of the shelves 92 is an integral spring member 94. Each spring member 94 has a fixed end 96 and an unsecured end 98 which is closer to the front of the magazine side than the fixed portion 96. Each spring member 94 can be seen through a corresponding slot 100 in the exterior 68 of magazine side (see e.g. FIG. 12). As can be seen in FIG. 12, the spring members 94 are set back slightly within the slots 100.

The unsecured end 98 of each spring member 94 has a laterally extending protrusion 102 which faces the interior 66 of the magazine side. The protrusion 102 has a cross-section which is contoured to engage with a recess in the cartridge side. As can be seen in the cross-section view of FIG. 11, the protrusion has an angled surface 104 and a curved surface 106. Curved surface 106 is proportioned to mate with the curved recess F in the side C of a disk cartridge A.

Referring to FIG. 3C, a vertical surface 108 lies between the end plates 70 of the magazine side, between the protrusions 102 and the structural walls 80a, 80b. A cut out 110 is formed in the magazine side, adjacent to the surface 108. The surface 108 has a cut away portion 112 which is contiguous with the cut out 110. A pair of reliefs 118 are formed in the surface 108.

Between the surface 108 and the spring members 94 are a plurality of recessed areas 111. The slots 100 described above are slightly visible between the protrusions 102 and the recessed areas 111 in FIG. 3C.

A structural wall 114 is spaced from, and parallel to, front face 74 of the magazine side. A pair of short cylindrical protrusions 116 extend from the structural wall 114, each one being on an opposite end of the structural wall. Each of the protrusions 116 extends towards one of the structural walls 82a, 82b.

The end plates 70 of the magazine side 26 are longer than the portion of the magazine side which extends between them. Thus, lower surface 120 each 70 (FIG. 3A) extends laterally of the magazine side.

Referring to FIG. 12, a wall 122 extends normally of the surface 120. The wall 122 has a recessed base portion 124 as well as an upper portion 126 which forms a shoulder 128 with the recessed portion 124. Back end 130 of upper portion 126 is tapered slightly away from surface 120.

Still referring to FIG. 12, it can be seen that the exterior surface of the magazine side 26 has a ramped portion 99 which angles away from the magazine side 26 as it nears the cutouts 100.

Cutouts 132 (FIG. 3C) extend through the magazine sides 26, adjacent to end plates 70.

A latching face 79 (FIGS. 2A, 19 and 20) is formed on exterior surface 68 of magazine side 26, between front face 74 and cutout 110. As can be seen in the cross-section view of FIG. 20, the latching face tapers towards interior side 66, and has a catching wall 81.

(b) Manual Release Tabs

Included in the cut away portion 112 of vertically extending surface 108 are a pair of cylindrical depressions 134 (FIG. 3C) which are oriented vertically on opposite sides of the cut away portion 112. The cylindrical depressions 134 form a seat in which a manual release tab 136 is positioned.

Figure 4A:
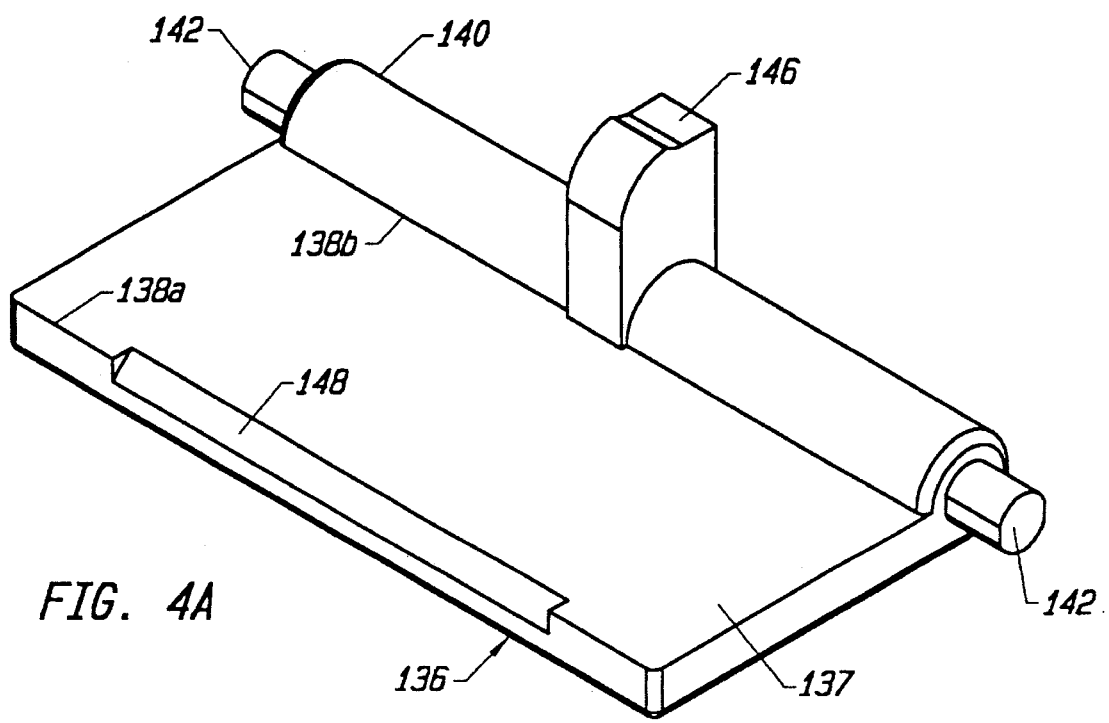
FIGS. 4A and 4B are perspective views of a manual release tab of the magazine of FIG. 1.
Figure 4B:
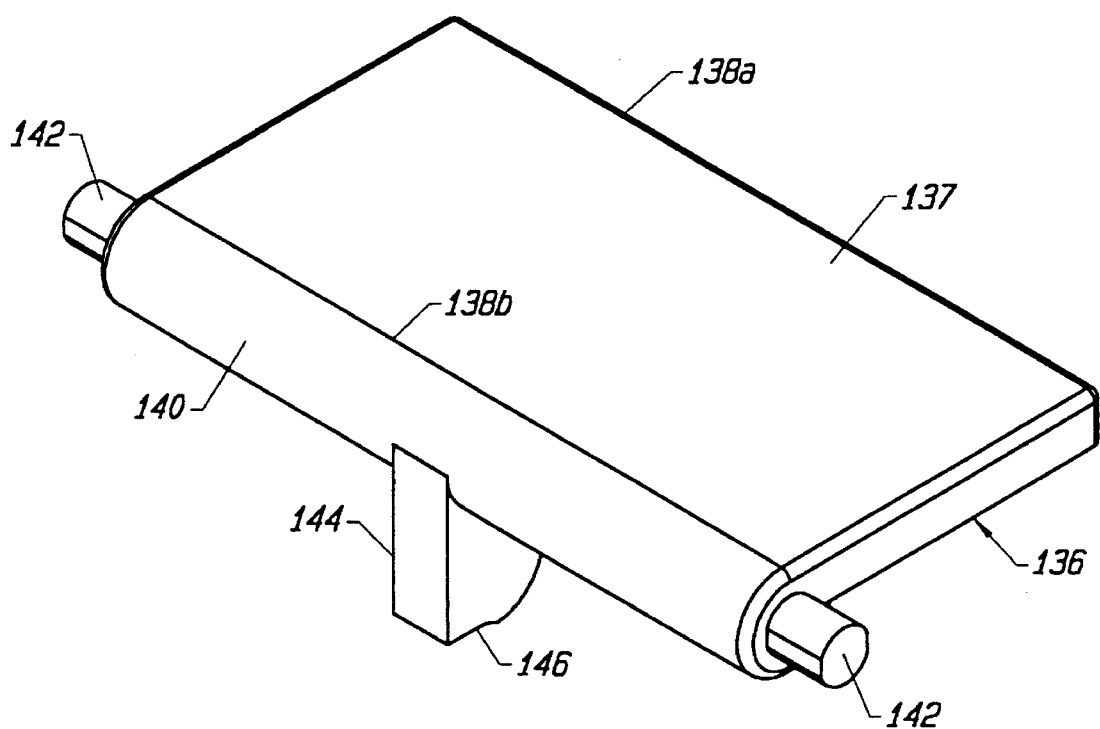

Referring to FIGS. 4A and 4B, the manual release tab 136 is comprised of a rectangular plate 137 having a pair of parallel long sides 138a, 138b. Side 138b is formed into a partial cylinder 140 having cylindrical projections 142 concentrically disposed at its opposite ends.

Centered along the cylinder 140, between the cylindrical projections 142 is a camming block 144 which is substantially perpendicular to the rectangular plate 137. The camming block 144 has a recessed surface 146 which faces away from the rectangular plate 137. A fingernail catch 148 is formed along long side 138a of rectangular plate 137, on the same side of the plate 137 from which the camming block 144 extends.

As can be seen in FIG. 3A, manual release tab 136 is positioned in the cut away 112 of vertical surface 108 in the magazine side 26 with cylindrical projections 142 disposed within cylindrical depressions 134 (these are most easily seen in FIG. 3C). Manual release tab 136 is pivotable about the cylindrical projections 142 between an open position in which the rectangular plate 137 is extending through the cut away 112 in a direction substantially perpendicular to the magazine side 26 (FIG. 17A) and a closed position in which the rectangular plate 137 covers the cut out 110 (see FIG. 17B).

The manual release tabs may be made from an injection molded plastic having good temperature stability, structural rigidity, impact resistance and wear resistance. One such material is glass filled nylon RF-1006 FR, made by LNP.

(c) Cartridge Lock

Figure 5A:
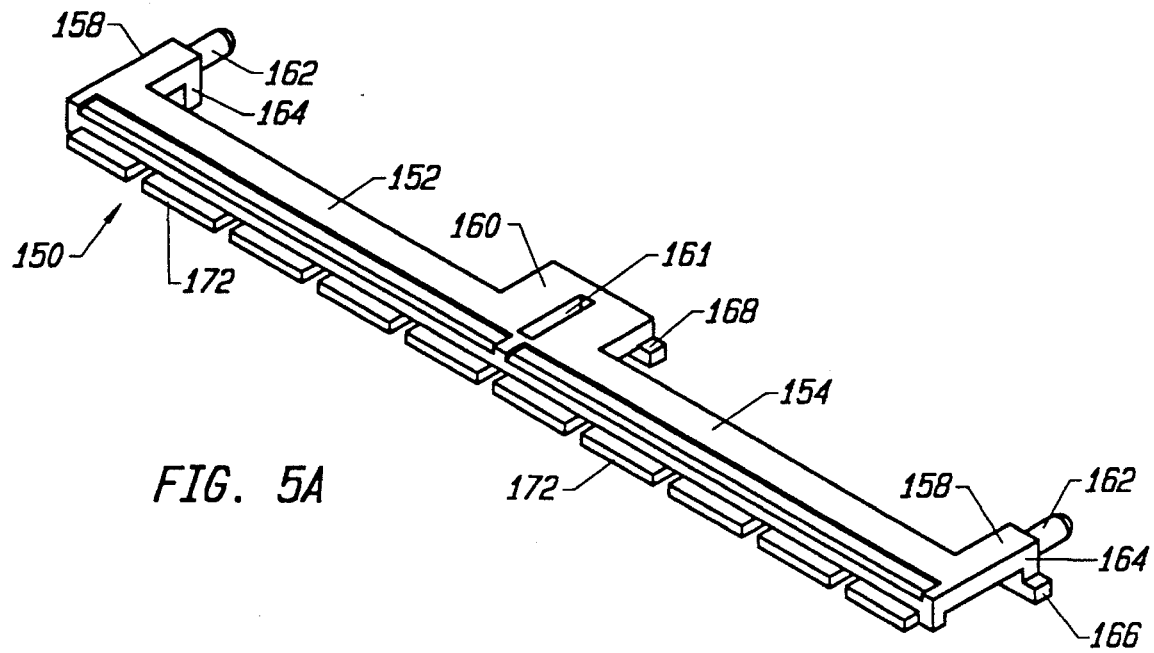
FIGS. 5A and 5B are perspective views of a cartridge lock of the jukebox of FIG. 1.
Figure 5B:
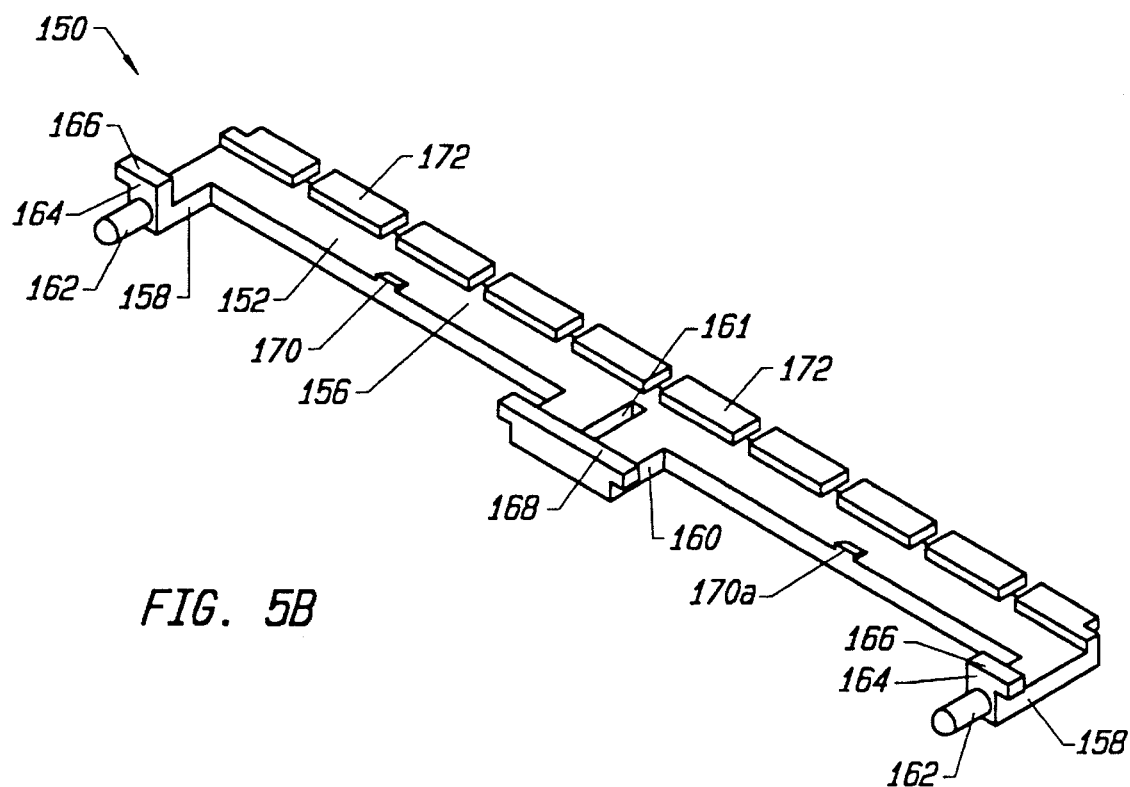

Manual release tab 136 is held in place by a cartridge lock 150. Referring to FIGS. 5A and 5B, the cartridge lock 150 is comprised of an elongate plate 152, the interior side of which is shown in FIG. 5A and the exterior side of which is shown in FIG. 5B. The terms "interior" and "exterior" refer to the direction in which the respective sides are facing when the magazine 10 is fully assembled. In other words, when the magazine 10 is assembled, the interior side of the cartridge lock faces the interior of the magazine, and the exterior side of the cartridge lock faces outwardly and contacts the interior 66 of the magazine side 26.

As can be seen in FIG. 5A, the elongate plate 152 is substantially E-shaped in that it has a pair of laterally extending portions 158 at each end and a third laterally extending portion 160 centered between the laterally extending portions 158.

A pair of cylindrical projections 162 are located on laterally extending portions 158. Each of the laterally extending portions 158 also has an L-shaped tab 164 which extends in a direction normal to exterior side 156 of the elongate plate 152. Each tab 164 has a member 166 which is parallel to the longitudinal axis of the elongate plate 152.

A rectilinear projection 168 extends from laterally extending portion 160 at the exterior side 156 of the cartridge lock. A slot 161 is formed through portion 160.

On opposite sides of the laterally extending portion 160 are a pair of catches 170 designed to engage cavities 118 of surface 108 (see FIG. 3C). A plurality of spaced blocking members 172 is formed along the exterior side 156 of the elongate plate 152. As can be seen in FIG. 3A, the cartridge lock 150 is installed in the magazine side 26 with its exterior side 156 (labeled in FIG. 5B) touching surface 108 of magazine side 26. Catches 170 (FIG. 5B) are slidingly engaged with reliefs 118 on the vertical surface 108. Laterally extending portions 158 rest between their corresponding internal walls 84a, 84b and plates 70 of magazine side 26, with the tabs 164 exposed through cutouts 132 (see, for example, FIG. 13).

As the cartridge lock 150 is installed, portion 160 drops between internal walls 80a and 80b, and its rectilinear projection 168 drops between wall 86 and wall members 85a, 85b. Once installed, projection 168 is slidable along wall members 85a, 85b at the exterior side 68 of magazine side 26.

Springs 174 are disposed around cylindrical projections 162 of the cartridge lock 150, and around respective ones of the short cylindrical projections 116 (see FIG. 3C) in the magazine side.

Each of the blocking members 172 of cartridge lock 150 extends behind a respective one of the spring members 94, on the opposite side of the spring member 94 from the protrusion 102. Cartridge lock 150 is slidable between an unlocked condition (FIGS. 14–16) in which the springs 174 are compressed and the cartridge lock 150 is positioned such that the blocking members 172 are behind the spring member 94, and a locked condition (FIGS. 10, 11 and 13) in which the springs 174 are extended and the elongate plate 152 is advanced rearwardly relative to the magazine side and thus contacts the spring members 94.

The cartridge lock 150 is positioned over the manual release tab 136 such that the camming member 144 of the manual release tab is disposed within slot 161 of cartridge locking member 150. As will be described in detail below, manual release tab 136 is pivotable about cylindrical projections 142 to cause camming member 144 to push the cartridge lock 150 into the unlocked condition (see FIGS. 17A and 17B).

Automatic means of moving the cartridge lock between the unlocked and locked conditions are also provided. The mechanisms for actuating movement of the cartridge lock will be fully described in the Operation section below.

The cartridge locks are preferably made from an injection-molded plastic having good temperature stability and flexural rigidity. The material should not be one which will creep over time and temperature with a sustained static load. The expansion coefficient of the cartridge lock material should be compatible with that of magazine side material. Low friction properties are also desirable. One example of material possessing the above properties is glass filled nylon RF-1002 FR which is manufactured by LNP.

(d) Jukebox Interface Mechanism

As can be seen in FIG. 1, a jukebox 14 of the type used with the apparatus of the present invention has a pair of interior walls 178 (only one can be seen in FIG. 1) on opposite sides of the chamber 18. When the magazine 10 is installed in the chamber 18, each of the magazine sides 26 faces one of the walls 178. Each of the walls 178 has one or more release tabs 180 (FIG. 6A. The arm portion 208 of each of two release tabs can be seen in FIG. 1). Briefly stated, these release tabs become engaged within recessed region 79 (see FIG. 2A) of the exterior 68 of the magazine sides. The release tabs 180 and their associated components will next be described.

(e) Latch Spring Assembly

Referring to FIGS. 6A–6D, each release tab 180 is mounted to an E-shaped spring plate 182. The spring plate 182 has a pair of laterally extending prongs 184, each of which is a mirror image of the other. The end of each prong 184 is split into two portions: a tang 186 which extends perpendicularly from the prong 184 and a tab 188 which extends perpendicularly from the prong and then bends upon itself to form a U-shape (a top view of a tab 188 can be seen in FIG. 14).

Centered on the spring plate 182, between prongs 184, is a large rectangular plate 190. Plate 190 has a pair of protruding sections 210 and a pair of small cutouts 206 in each of the protruding sections.

The latch spring plates 182 are preferably made from a sheet steel, such as ½H 302 stainless steel or other sheet steels having similar spring characteristics. During manufacture, all form bends should be made across the grain of the sheet steel for optimum fatigue and notch resistance.

Referring to FIGS. 6A and 6B, release tab 180 has a latch member 192 formed at one end. The latch member 192 has a number of raised portions 194, 195 each of which has a slot 196, 197 passing between it and surface 198 of the latch member 192. Also, formed on surface 198 are ramped catch surfaces 200.

The latch member 192 has a substantially triangular cross section, formed by wide faces 198 and 202 and a narrow catch face 204.

Referring to FIG. 6C, the release tab 180 is mounted to the spring plate 182 by sliding each of the protruding sections 210 of the plate 190 between a raised portion 194 and a raised portion 195 thereby causing the edges of the protruding sections 210 to slide into slots 196, 197. The ramped catch surfaces 200 snap into cut outs 206, leaving the arm 208 of the release tab 180 positioned between the protruding sections 210.

As shown in FIG. 6D, when the release tab 180 is mounted to the spring plate 182, the narrow catch face 204 on the latch member 192 extends laterally from the plate 190.

Figure 7:
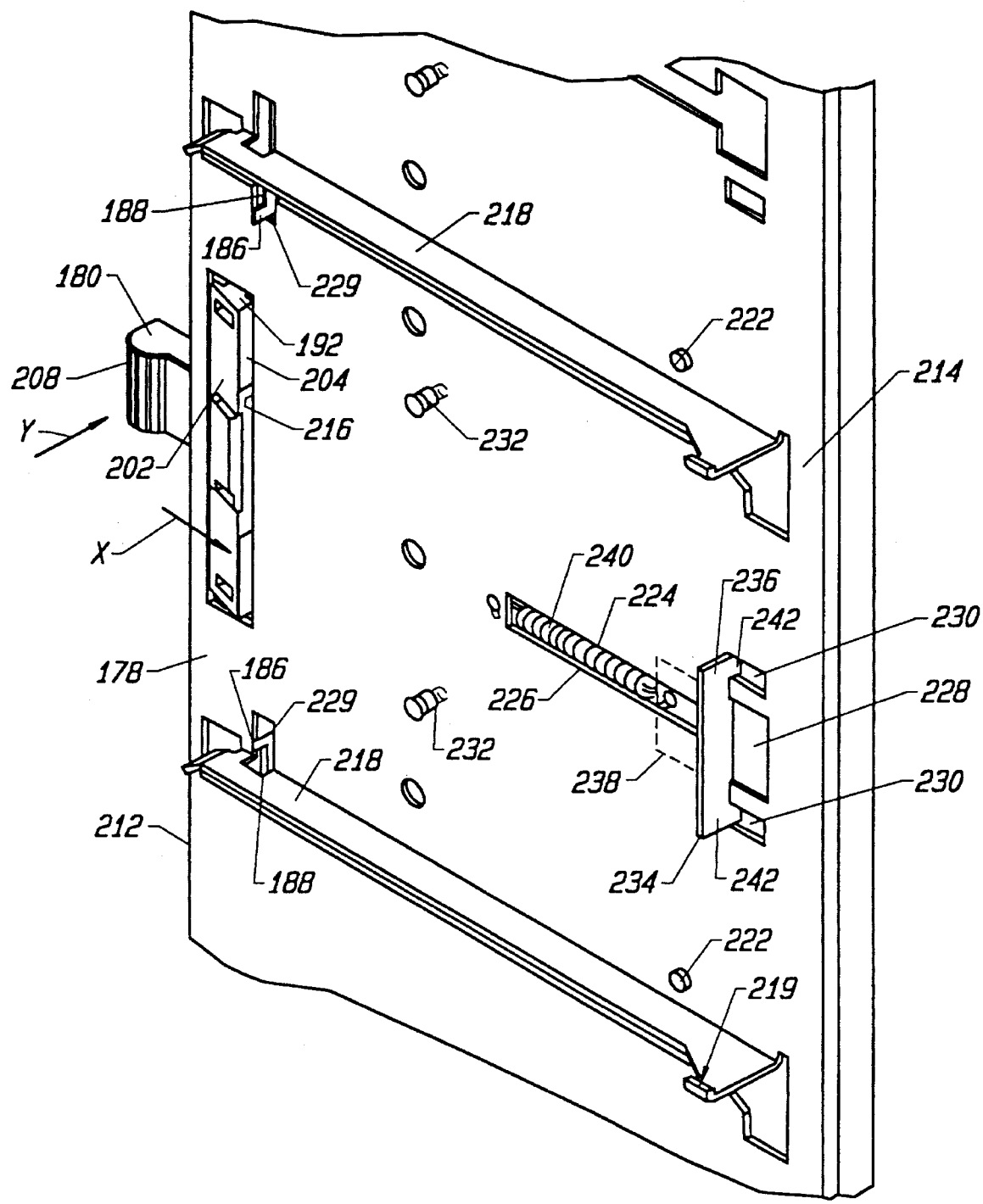
FIG. 7 is a perspective view of an interior surface of a jukebox wall of the jukebox of FIG. 1, showing the latch spring assembly mounted to the jukebox wall.

As shown in FIG. 7, a jukebox wall 178 has a front edge 212 and a back edge 214. An elongate cut out 216 is formed in the wall 178 close to, and parallel with, front edge 212. A substantially horizontal shelf 218 extends from wall 178. If the jukebox 14 has capacity for more than one magazine, more than one shelf 218 is provided.

A guide pin 222 protrudes from the wall 178 at a location slightly above the shelf 218. A vertical projection 219 is connected to the shelf 218, near the back edge 214 of the wall 178.

A second cut out 224 is formed near the back edge 214 of the wall 178. It has a substantially horizontal elongate section 226 and a shorter substantially vertical section 228 which joins the elongate section 226 to form a "T". A pair of small cut outs 230 are positioned above and below the short section 228 of cut out 224.

Figure 8:
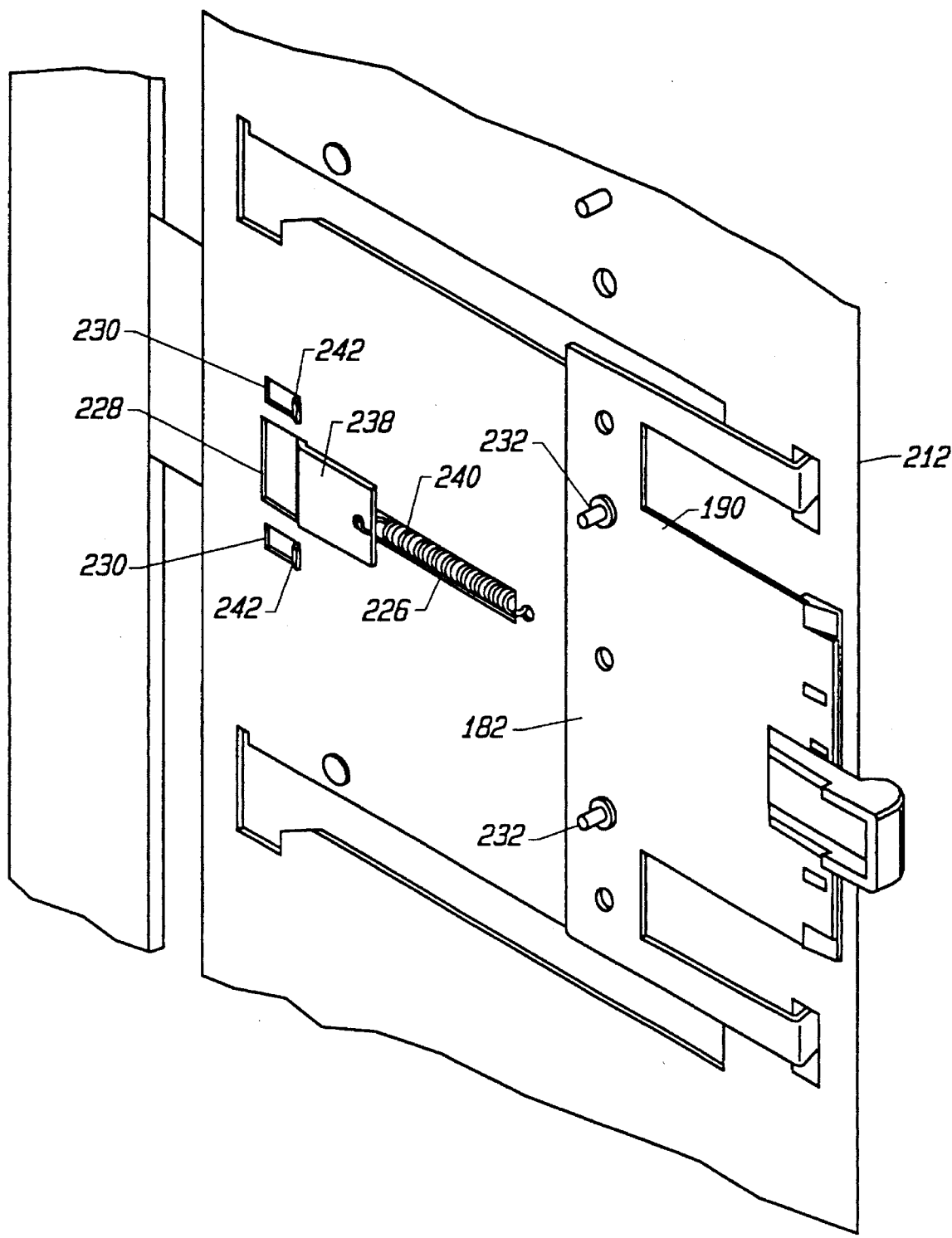
FIG. 8 is a perspective view of the exterior surface of the jukebox wall of FIG. 7, showing the latch spring assembly mounted to the jukebox wall.

Spring plate 182 is secured to wall 178 by a pair of threaded stand offs 232 (see also FIG. 8). The spring plate 182 is mounted to the exterior surface of the wall 178 and is oriented such that faces 202 and 204 of the latch member 192 extends through the slot 216. Because of the triangular cross section of the latch member 192, the face 202 angles away from the wall 178 as shown in FIG. 7. Moreover, as best shown in FIG. 12, the tangs 186 and tabs 188 extend through cutouts 229 in the wall 178, near shelves 218. The top through cutout 229 need not be near a shelf 218.

The spring plate 182 can be deflected away from wall 178 by applying pressure to the face 202 in the direction of the arrow designated X in FIG. 7, or to the arm 208 in the direction of the arrow Y in FIG. 7. The spring plate 182 will spring back to its resting state (which is the state shown in FIG. 8) when pressure on the face 202 or arm 208 is relieved.

A magazine stop 234 is provided which is comprised of a push plate 236 extending perpendicularly from the interior surface of the wall 178 and a spring connector plate 238 joined to the push plate 234 and extending perpendicularly from it. Push plate 236 extends through the short section 228 of cut out 224, and the spring connector plate 238 is slidable along the exterior surface of wall 178. Tabs 242 extend from push plate 236 and protrude through cut outs 230.

Spring connector plate 238 is connected to one end of spring 240 which has another end connected to the wall 178 adjacent to the elongate section 226 of slot 224. The spring 240 is disposed within the elongate section 226. Push plate 236 is slidable within the cut out 224 towards the back edge 214 of wall 178 when a force sufficient to overcome the force of spring 240 is applied to it.

It should be pointed out that the magazine sides 26, cartridge lock 150, manual release tabs 136, latch spring plates 182 and the components affiliated with them are not "left" and "right" parts. Rather, the preferred embodiment of the present invention is designed such that identical components are used for both sides of the magazine and the magazine-jukebox wall interface in order to minimize component parts costs (e) Disk Cartridges An understanding of the locking and misinsertion prevention functions of the magazine requires an understanding of the features of disk cartridges which are housed by the magazine.

Referring to FIGS. 9A and 9B, it can be seen that a disk cartridge 12 includes a forward edge A, which is the end at which the shutter (not shown) is located. The shutter is slidable to expose the disk contained inside the cartridge, for reading from or writing to the disk and thereby provides a port through which the cartridge is interfaced to the central processing unit. A rear edge B is parallel to the forward edge A.

Sides C are tapered near forward edge A. A pair of recessed portions E are formed at the tapered portions of sides C. Each recessed portion E includes a curved section F.

Near the rear edge B are a pair of notches D. The corners G between sides C and edge B are squared.

II. Operation

(a) Cartridge Locking and Unlocking

As shown in FIG. 1, disk cartridges 12 are inserted into the assembled magazine 10 through an opening in the back of the magazine. During transport (i.e., before a loaded magazine is installed in a jukebox 14), the magazine 10 is in a locked condition which prevents the disk cartridges 12 from falling out through the opening (not shown) in the back of the magazine 10. Before disks can be inserted into or removed from the magazine (i.e. either manually or by a robotic unloading device positioned inside the jukebox), the magazine must be placed in an unlocked condition.

Figure 10:
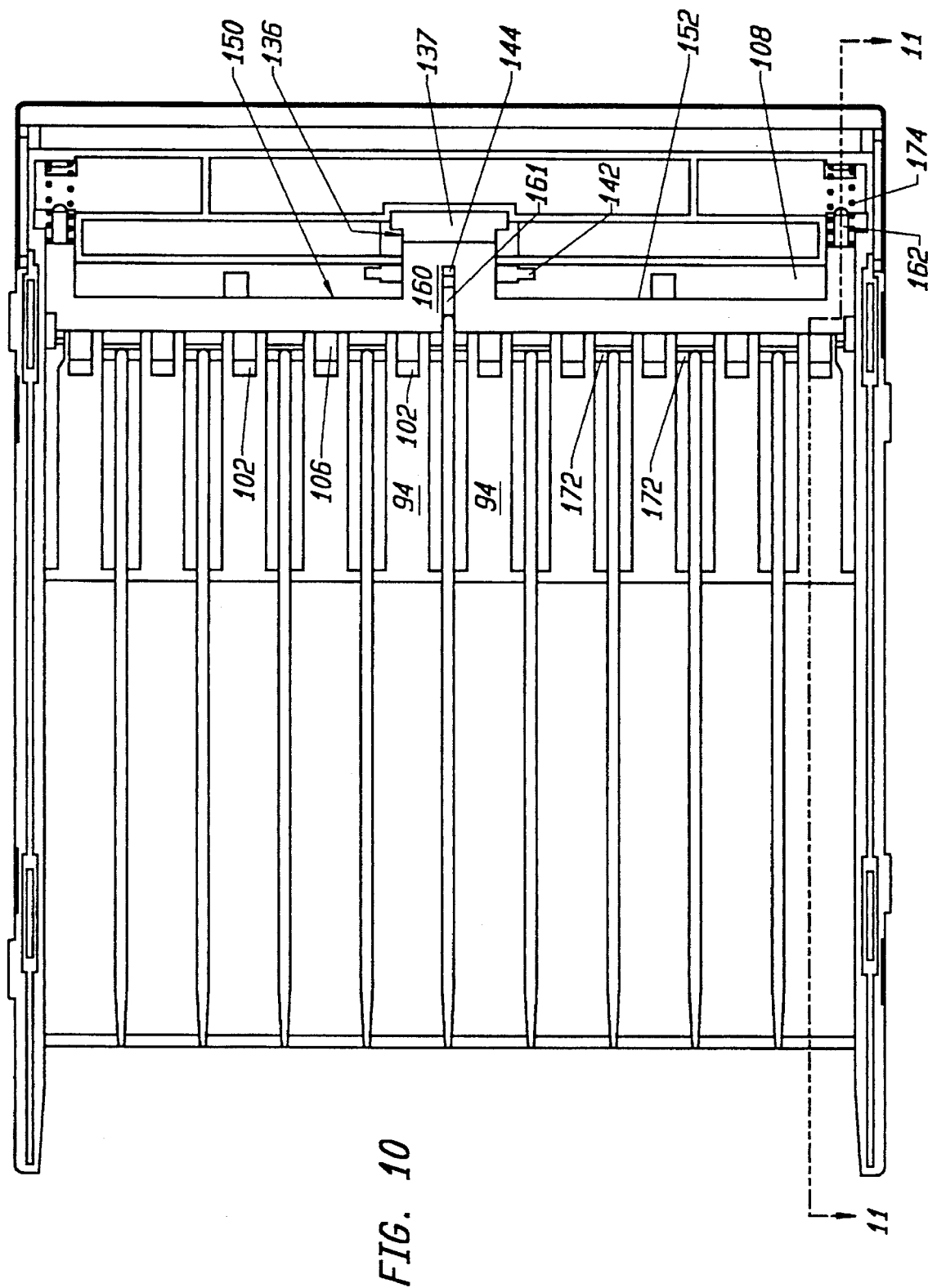
FIG. 10 is a side elevation view of an interior side of the magazine side of FIG. 3A, showing the cartridge lock in the locked position.
Figure 11:
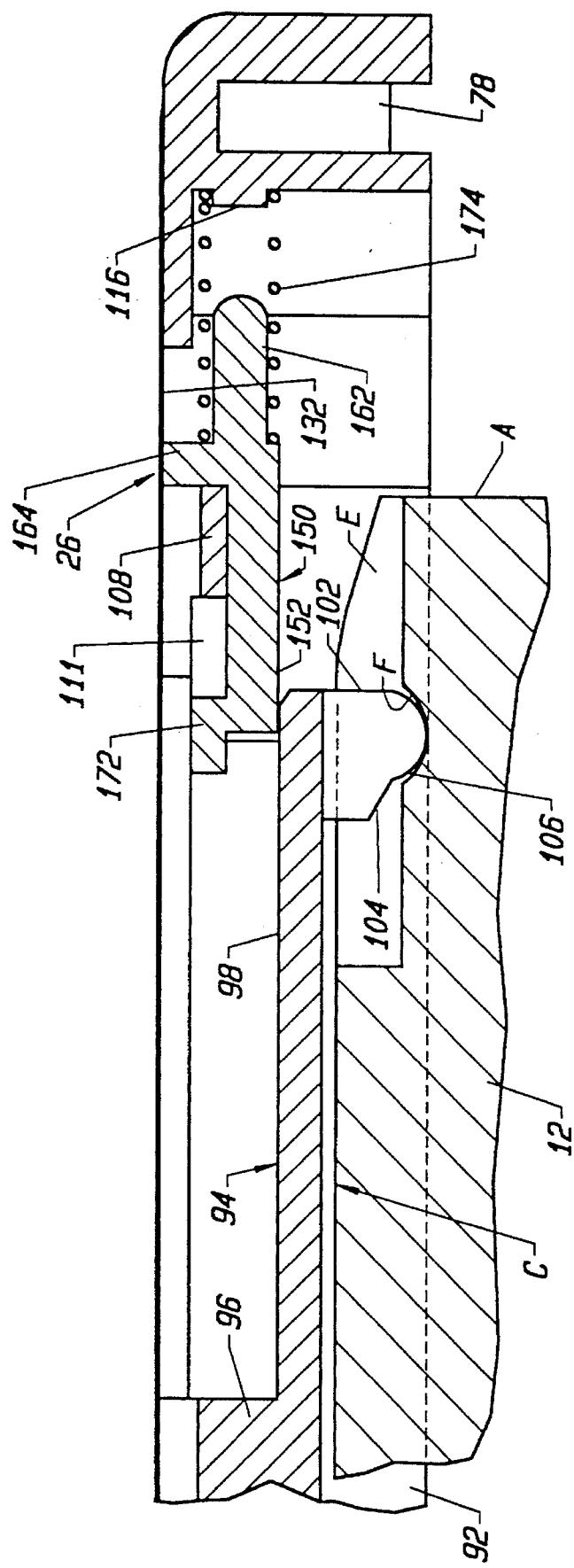
FIG. 11 is a cross-sectional top view of the magazine side of FIG. 10, taken along the plane designated 11—11 in FIG. 10.
Figure 13:
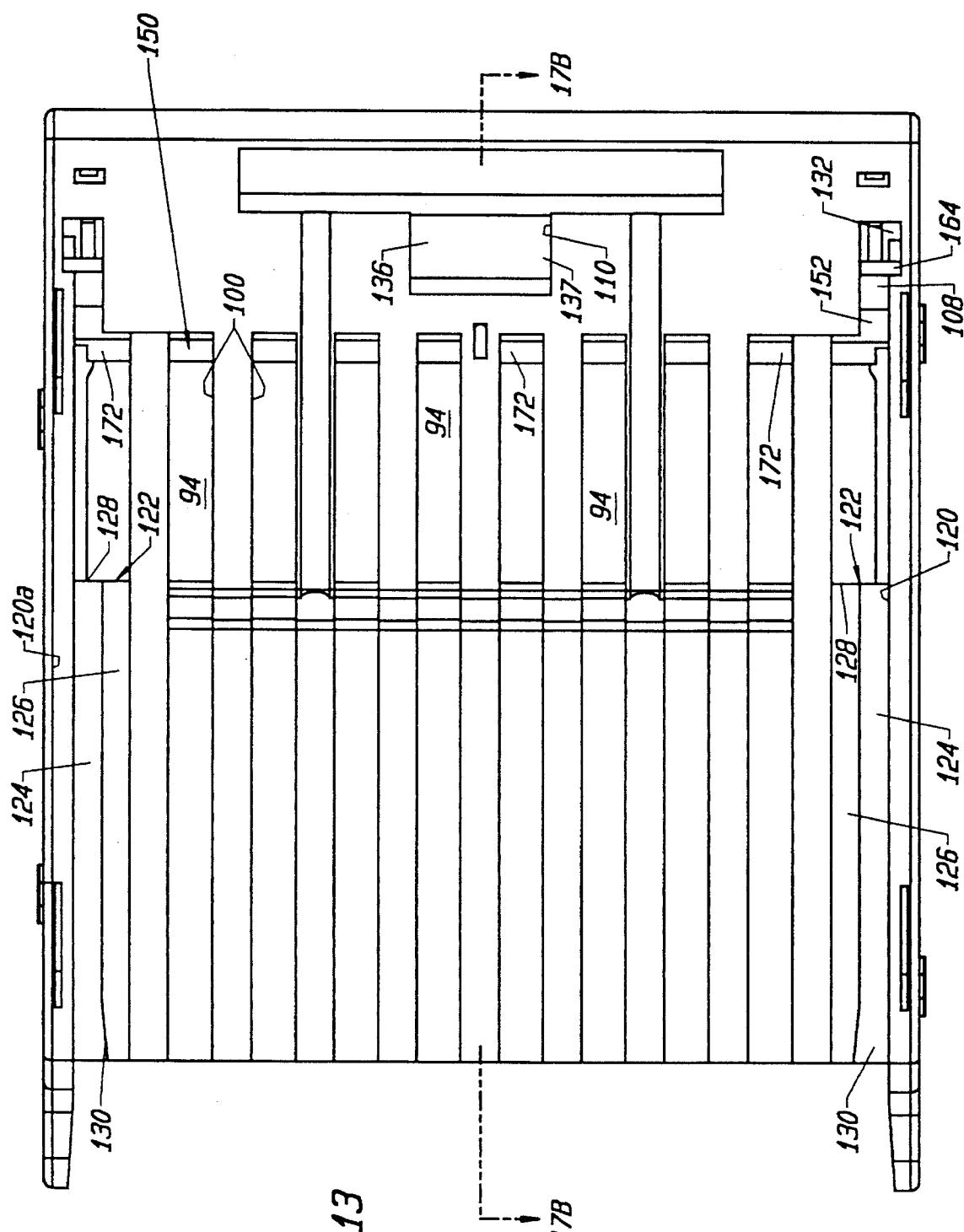
FIG. 13 is a side elevation view of the magazine side of FIG. 3A, viewed from the exterior of the magazine, showing the cartridge lock in the locked position.

FIGS. 10, 11 and 13 show the cartridge locking condition of the magazine. Locking of the cartridges in magazine is carried out by moving the cartridge lock 150 into a position in which its member 152 blocks outward deflection of the spring members 94.

FIG. 11 shows a disk cartridge 12 supported on one of its sides C by a shelf 92 in one of the magazine sides 26. It should be appreciated that the opposite side of the cartridge is supported and locked in place in an identical fashion by a magazine side which is a mirror image of the magazine side 26 shown. Protrusion 102 of spring member 94 extends into the recessed portion E of the disk cartridge 12, with curved surface 106 resting in curved region F of the cartridge.

The cartridge lock 150 is positioned such that the elongate plate 152 rests against the unsecured ends 98 of spring members 94, thereby preventing the unsecured ends 98 from deflecting away from the cartridge 12. The spring 174 disposed around the cylindrical protrusions 162 is at its maximum extension. Because the unsecured ends 98 cannot deflect, the protrusions 102 remains engaged with the curved recesses F in the respective disk cartridges, and prevent removal of the disk cartridges from the magazine 10.

Tabs 164 are positioned in abutment with the vertical surface 108. As can be seen in FIG. 17B, the manual release tab 136 is oriented with its rectangular plate 137 extending across the cut out 110 in the magazine side.

Figure 14:
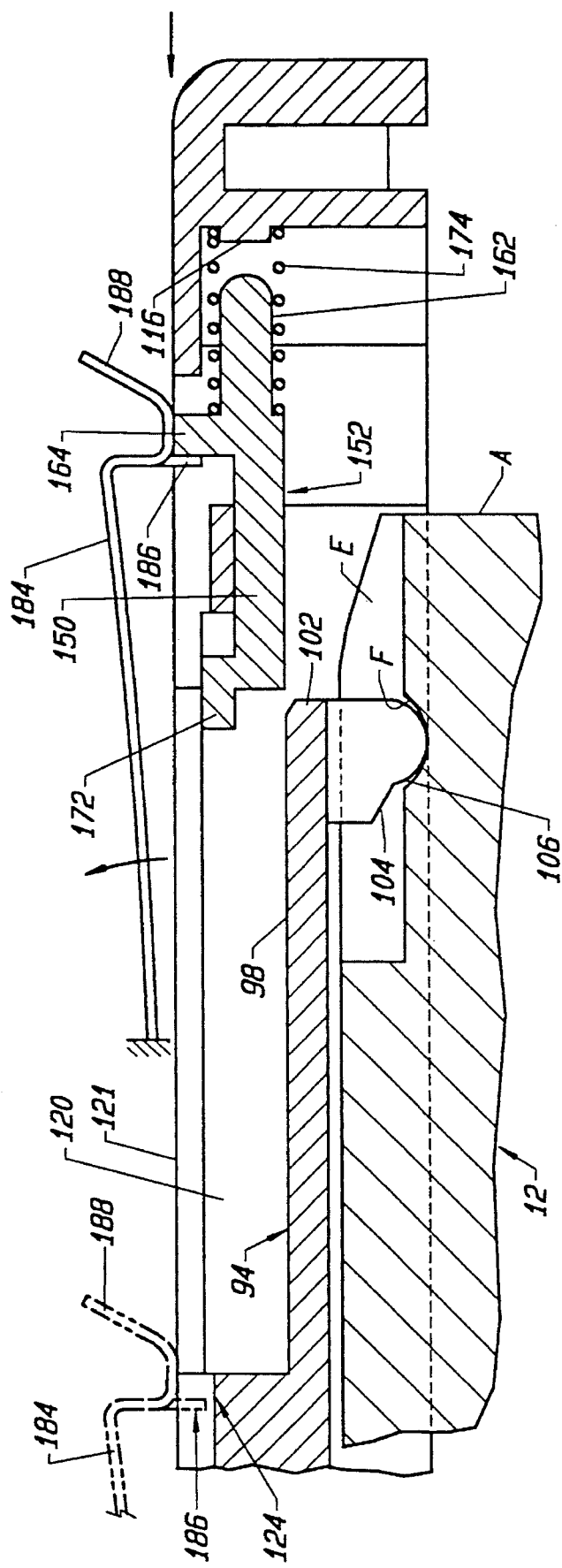
FIG. 14 is a cross-sectional top view similar to the view of FIG. 11, further showing the cartridge lock being held in the unlocked position by a tang on a latch spring member, and further showing in dashed lines the tang as it is approached by a magazine but before it cams the cartridge lock into the unlocked position.
Figure 15:
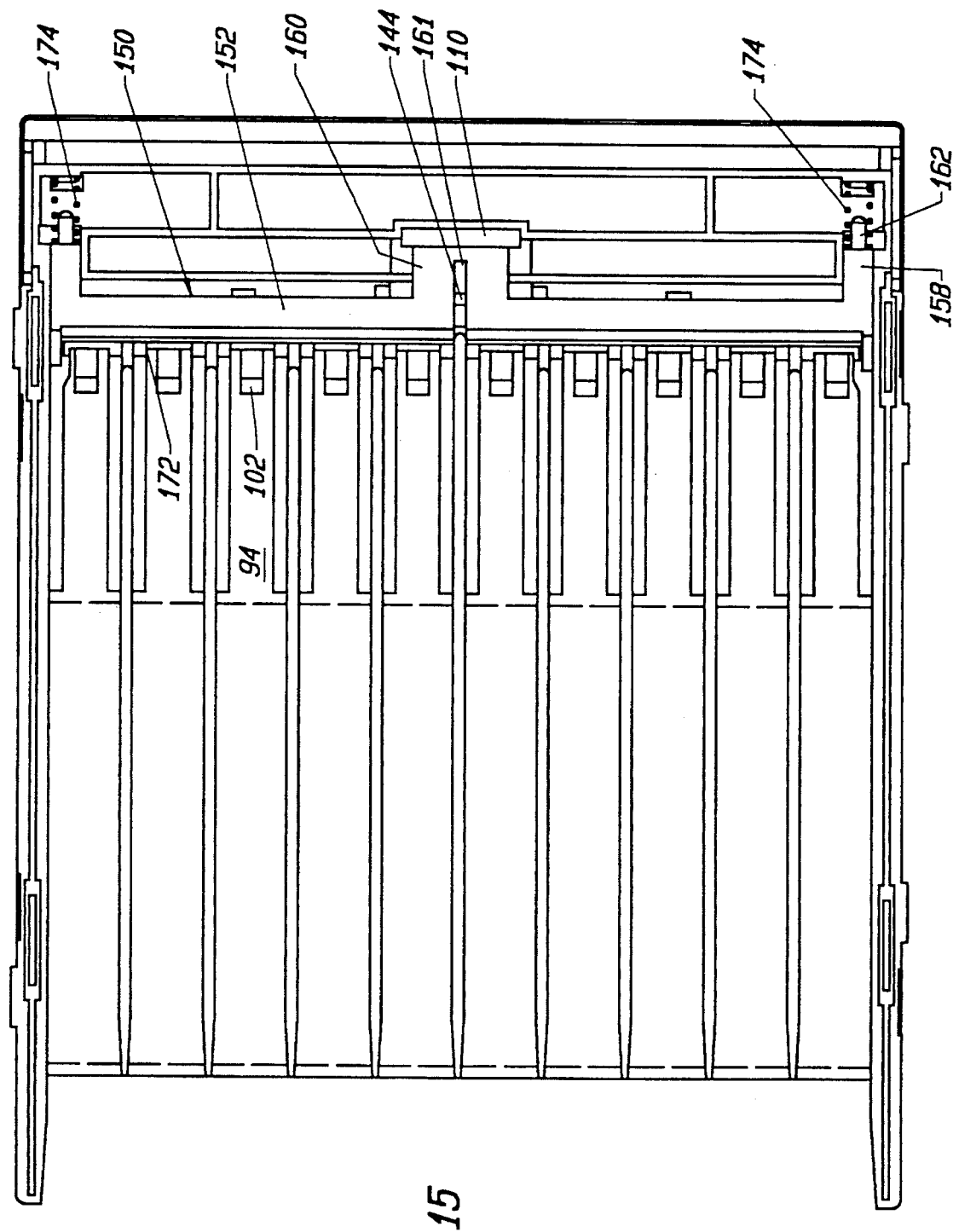
FIG. 15 is a side elevation view of the interior of the magazine side of FIG. 3A, showing the cartridge lock in the unlocked position when unlocked via a manual release tab.

FIGS. 14, 15 and 16 show the cartridge lock 150 in its unlocked condition. Referring to FIG. 14, when in the unlocked condition the cartridge lock 150 is moved towards the front of the magazine side 26, thereby compressing springs 174. Elongate plate 152 is moved away from the unsecured end 98 of spring members 94, thereby giving the spring members 94 room to deflect. This allows curved surfaces 106 of protrusions 102 to move away from curved recesses F on each disk cartridge 12.

Blocking members 172 of the cartridge lock 150 remain behind the spring members 94 to limit the amount by which they can deflect. This operates to prevent backwards insertion of a disk cartridge, as will be described more fully with respect to FIG. 18.

The apparatus of the present invention has two mechanisms by which the magazine 10 can be unlocked: (1) an automatic mechanism which moves the cartridge lock into its unlocked condition as the magazine is inserted into the jukebox 14; and (2) a manual unlocking function which utilizes the manual release tab 136. The automatic function is necessary to insure that the magazine is unlocked when it is inserted into the jukebox unit so that the robotic cartridge retrieval mechanism inside the jukebox unit can remove a selected cartridge from the magazine and transport it to a disk reading location. The manual unlocking function facilitates loading and unloading of disks when the magazine is not inside the jukebox, i.e., when the user wishes to modify the selection of disks stored in the magazine.

(b) Automatic Unlocking Function

Figure 19:
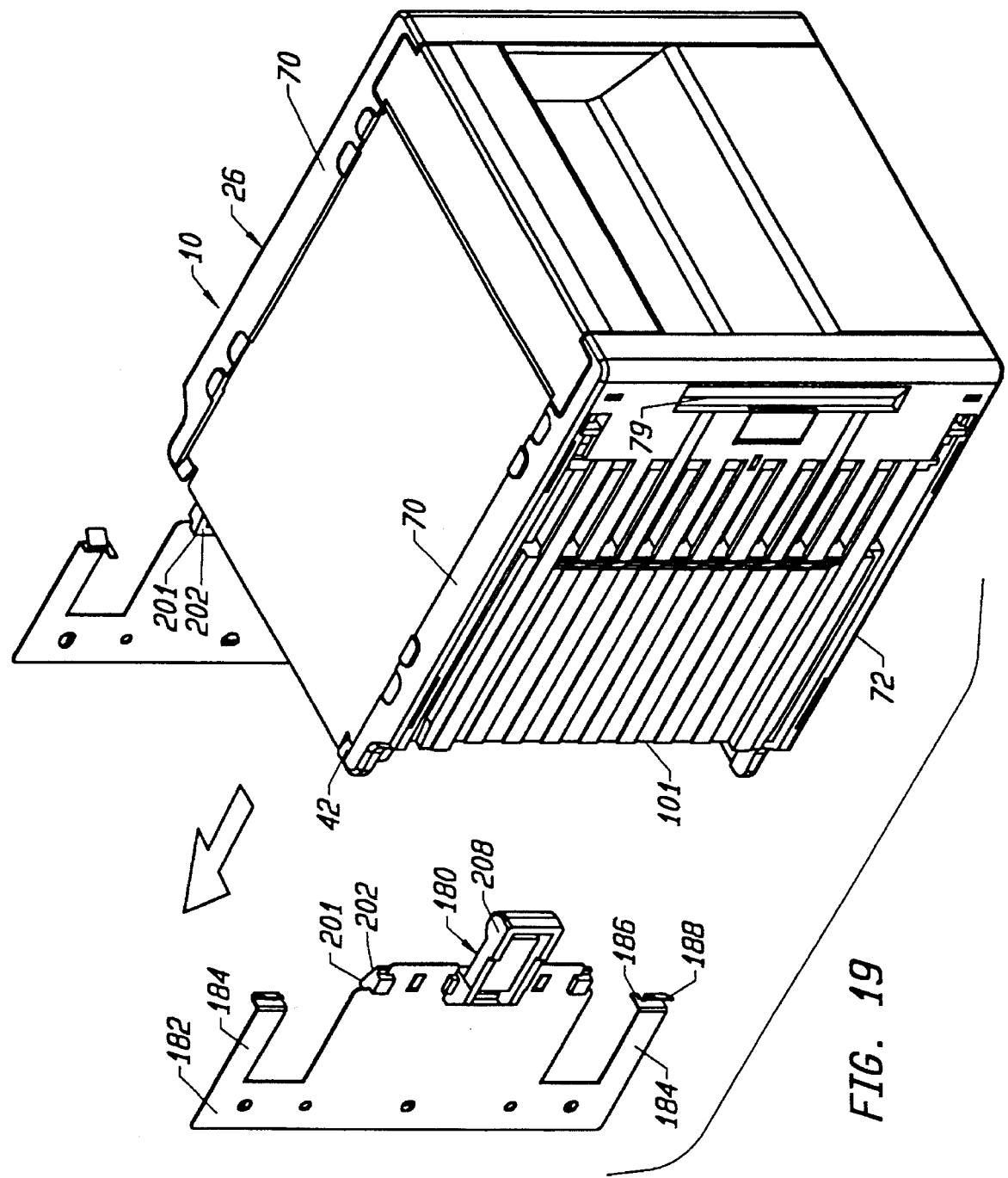
FIG. 19 is a perspective view of the magazine of FIG. 1 being advanced towards a pair of the latch spring members of FIGS. 6C and 6D (for the purpose of the figure, the latch spring members are not shown connected to jukebox walls).

As can be seen in FIG. 19, the tangs 186 and the tabs 188 on the spring plate 182 (which as discussed with respect to FIG. 7 is mounted to wall 178 with the tabs 188 extending through the wall) are positioned to engage with a respective one of the plates 70 on the magazine side 26 when the magazine 10 is inserted into the jukebox 14 (not shown in FIG. 19). Tangs 186 are free to travel between surfaces 120 and shoulders 128 (see FIG. 12) while remaining close to, but not touching, surfaces 124 (see the tang 186 shown in dashed lines in FIG. 14), because side surfaces 121 of plates 70 slide in contact with the tabs 188. The magazine 10 is advanced into the jukebox (not shown) until, as shown in FIG. 14, tab 164 of the cartridge lock 150 collides with the tang 186.

Continued advancement of the magazine 10 into the jukebox causes the tab 164 to catch on the tang 186, thereby preventing the cartridge lock 150 from moving further into the jukebox with the magazine side 26. As result, the cartridge lock 150 is moved forward within the magazine side 26 to compress the spring 174 and to thereby position the cartridge lock 150 in the unlocked condition shown in FIG. 14. As described above, this moves the elongate plate 152 away from the spring members 94, allowing them to deflect outwardly in response to removal of a cartridge 12 from the back of the magazine 10.

(c) Locking Function of Manual Release Tab

Referring to FIGS. 13 and 17B, when the magazine is in the locked condition the manual release tab 136 is positioned such that its rectangular plate 137 at least partially covers the cut-out 110 in the magazine side 26. The camming block 144 of the manual release tab 136 extends through the slot 161 of the cartridge lock 150.

To manually slide the cartridge lock 150 into the unlocked condition, the rectangular plate 137 is lifted at fingernail catch 148 (FIG. 4A) and pivoted away from the magazine side 26 (around cylindrical projections 142) in the direction indicated by the arrow in FIG. 17B. As the manual release tab 136 pivots, the camming block 144 pushes against the cartridge lock 150 from within slot 161 thereby pushing the cartridge lock 150 towards the front of the magazine side. As described above (see FIG. 14) when the cartridge lock 150 is in the forward, unlocked condition, the portion 152 of the cartridge lock 150 no longer blocks movement of the spring members 94 and thus creates a gap for movement of the spring members.

When the manual release tab 136 is moved to the unlocked condition, recessed surface 146 (best shown in FIG. 4A) engages with rectilinear projection 168 of cartridge lock 150 as shown in FIG. 17A. Manual release tab 136 will remain in this position until it is manually returned to its locked condition (FIG. 17B) or until it is cammed into the locked condition by the leading edge of the jukebox housing 212 during installation of the magazine into a jukebox.

(d) Misinsertion Prevention

Figure 18:
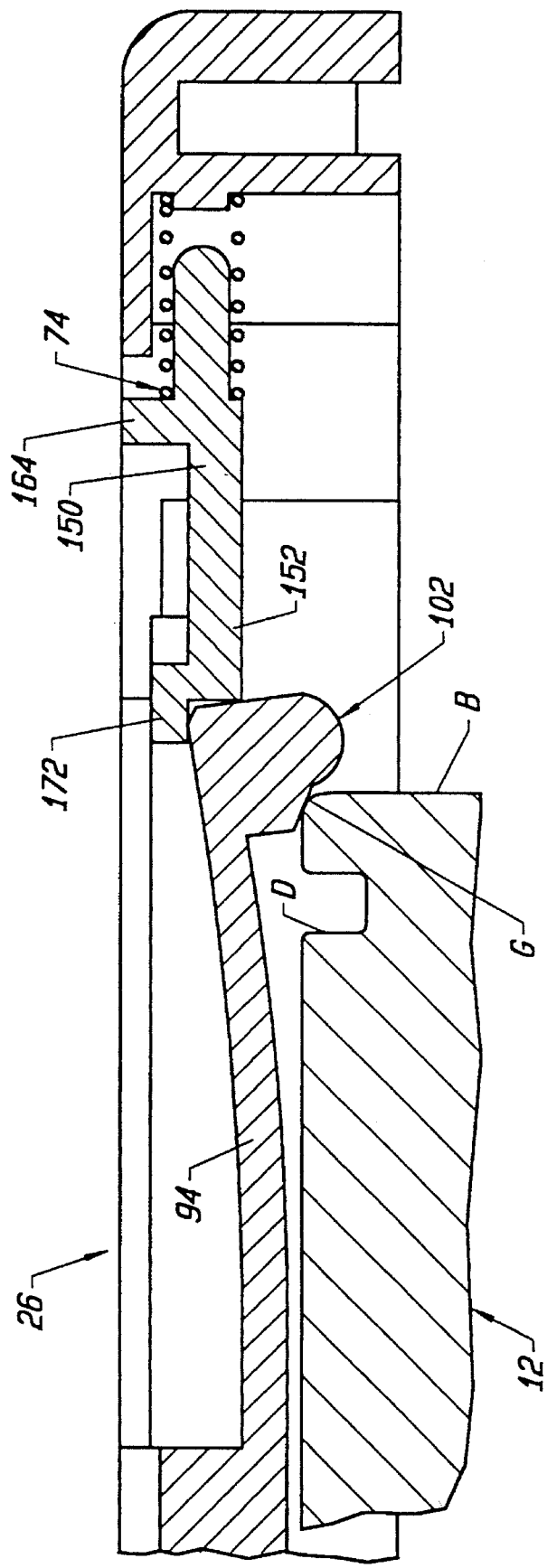
FIG. 18 is a cross sectional top view of a magazine side according to the present invention taken along the same plane as that shown in FIG. 14 and further showing an improperly inserted cartridge being blocked by a blocking member.

FIG. 18 illustrates what happens when a user attempts to insert disk cartridges 12 into the magazine 10 wrong-end first. As described earlier, a disk cartridge has a tapered end A and a squared end B. The magazine is designed to receive cartridges that are inserted tapered-end A first. When squared end B is inserted into the magazine 10, its corner G collides with the protrusion 102 on the spring member 94 causing the spring member 94 to deflect outwardly.

When the cartridge lock 150 is in its unlocked condition, the blocking members 172 remain spaced from the protrusions 102 in order to prevent over-deflection of the spring members 94. The corners G of an improperly inserted disk cartridge would require deflection of the spring members 94 beyond that which is allowed by the blocking members 172. Thus, when a wrongly-inserted disk cartridge pushes a spring member 94, the spring member 94 collides with its corresponding blocking member 172 and cannot deflect any further. Since the deflection is not sufficient to allow passage of the disk cartridge into the slot, the user's inability to advance the cartridge further into the slot indicates to the user that the disk cartridge is being improperly inserted.

(e) Magazine Insertion and Latching

The magazine 10 is inserted into the jukebox chamber 18 via open door 20 (FIG. 1). Shelves 218 on each of the jukebox walls 178 (FIG. 7) receive the bottom one of the plates 70 of the magazine side 26 and, as described above with respect to the automatic locking function (FIG. 14), the tab 188 engages with the plates 70. Referring to FIG. 19, as the magazine is inserted into the chamber 18, the ramped portion 99 of the magazine sides 26 presses against the ramped surface 202 of the release tab 180. This deflects the spring plate 182 away from the wall 178 as the side 201 (see FIG. 6A) of surface 202 rides along the outermost surface of the magazine sides 26. As the magazine 10 reaches the end of its travel, rear edge 101 (FIG. 19) of the magazine side 26 contacts the push plate 236 of the magazine stop 234 (FIG. 7), causing the user to encounter the spring forces exerted by extension spring 240.

Figure 20:
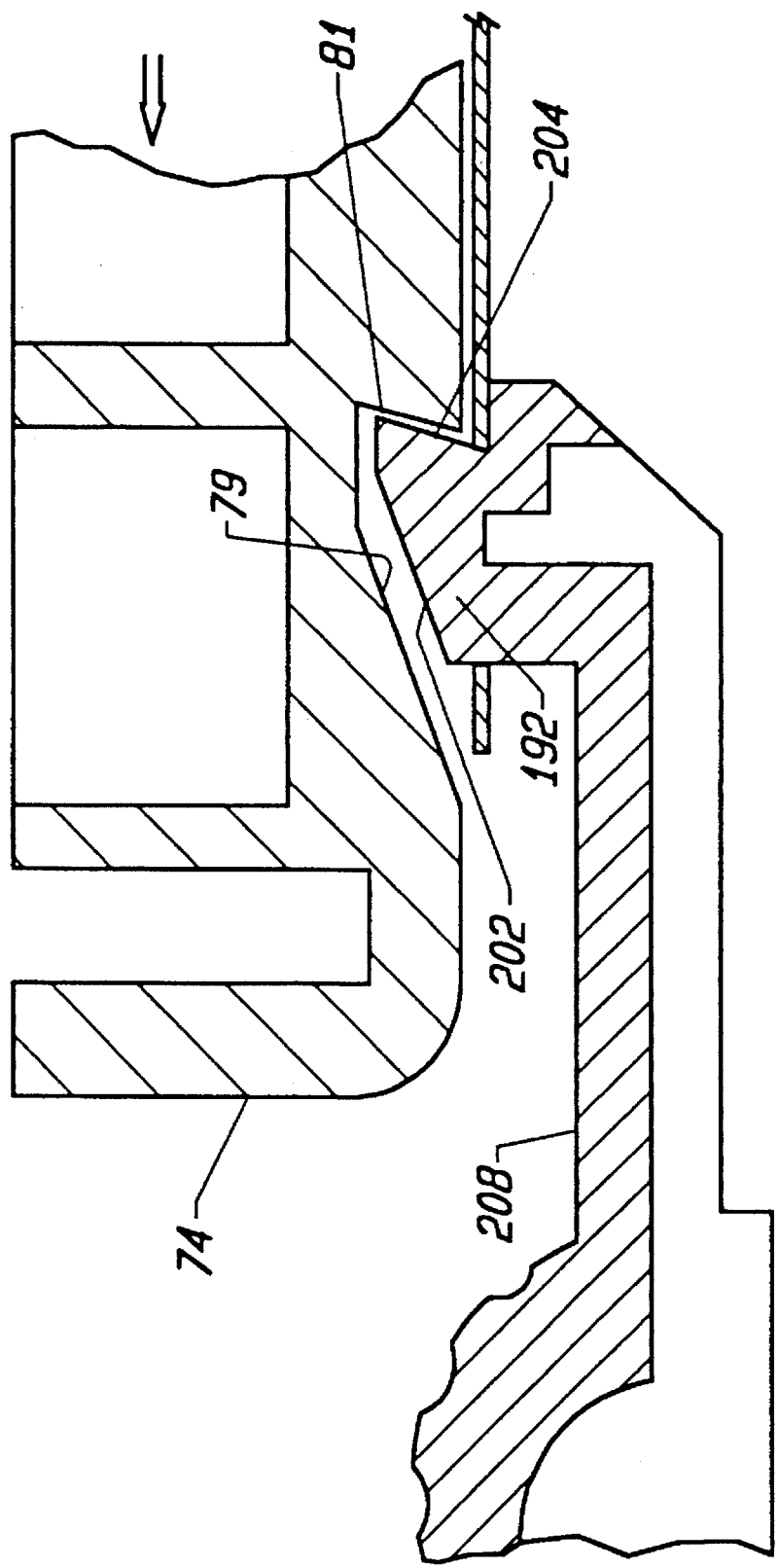
FIG. 20 is a partial cross-sectional top view of the magazine side of FIG. 3A engaged with a release tab in the manner which occurs after a magazine is installed in the jukebox of FIG. 1.

The user continues pushing the magazine 10 into the jukebox 14, further extending the extension spring 240 until the travel of the push plate 236 is halted when the tabs 242 come into contact with the rear edges of the cut-outs 230. At this point, the latching face 81 of the magazine side 26 has just passed aligned the face 204 of latch member 192 of the release tab 180 as shown in FIG. 20. This relieves the pressure exerted by the exterior of the magazine side 26 against the latch member 192, and thus allows the latch spring plate 182 to return to its undeflected condition. The latch member 192 snaps inwardly, engaging with the similarly angled latching face 81 on the magazine side 26.

The extension spring 240, via the push plate 236, pushes the magazine 10 slightly forward and in doing so causes the latching faces 81 on the magazine side 26 to intimately engage with the latch member 192. To prevent excessive vertical play of the magazine 10 within the jukebox 14, guide pins 222 (FIG. 7) engage magazine sides 26 between the shoulders 128 and the surfaces 120.

To remove the magazine 10 from the jukebox 14, the user applies outward force, either separately or simultaneously, to the arms 208 of the release tabs 180. The resulting deflection of the arms 208 is sufficient to disengage the latch member 192 from the latching faces 81 on the magazine side 26. The tension forces in the spring 240 are sufficient to propel the magazine 10 out of the jukebox 14 (i.e. to push it sufficiently forward so that it is obvious to the user that the magazine is no longer latched within the jukebox) as soon as the latch member 192 is disengaged from the latching face 81. The user can then grip the handle formed by the plate 58 and the recessed portion 56 of the magazine front section 30 (FIG. 2A) to remove the magazine 10 from the jukebox 14.

(f) Automatic Cartridge Re-Locking

It should be pointed out that as the magazine 10 is removed from the jukebox 14, the tab 164 of the cartridge lock 150 is moved away from tang 186 which, at all times when the magazine is installed, pushes the cartridge lock 150 against the compression spring 174 in order to keep the magazine unlocked. As the magazine 10 is withdrawn from the jukebox 14 and the tab 164 is thus moved away from the tang 186, the cartridge lock 150 is pushed by the springs 174 back into its locked condition (FIG. 11) so that the disk cartridges 12 will not fall out of the magazine 10 after the magazine 10 is removed from the jukebox 14.

(g) Magazine Misinsertion Prevention

Tabs 42 on the back edge 38 of magazine top 22 (see FIG. 2A) help to prevent a user from inserting the magazine 10 into the jukebox 14 upside down. Should a user attempt to install the magazine 10 upside down, the tabs 42 will contact vertical projections 219 on the shelves 218 (see FIG. 7), indicating to the user that the magazine is being installed improperly.

(h) Magazine Stackability

One magazine may be stacked upon another with a fair degree of stability by engaging small protrusions 45 on the magazine sides 26 of one magazine with corresponding depressions 47 on the magazine sides of another magazine. These protrusions and depressions are best shown in FIG. 2A and 3C.

CONCLUSION

The apparatus of the present invention has been described with respect to a single preferred embodiment. However, it should be appreciated that the invention may be practiced in a variety of ways. This description is not intended in a limiting sense, as the scope of the present invention is to be limited only in terms of the appended claims.

What is claimed is:

1. A disk cartridge magazine for holding a plurality of disk cartridges comprising:

(a) a frame having a first side member and a second side member connected to the first side member in spaced relationship, said side members having respective first and second interior sides, each of which faces the other of the first and second interior sides;

(b) a plurality of cartridge separators connected to the frame and positioned between the first and second side members to form a plurality of cartridge slots; and (c) a spring member connected to the first interior side and having a cartridge contacting end adjacent to at least one of the cartridge slots and extending towards the second interior side such that, when a disk cartridge is positioned in said one of the cartridge slots, the disk cartridge is retained between the cartridge contacting end of the spring member and the second interior side, the cartridge contacting end being deflectable in a direction away from the second interior side upon application of pressure against the cartridge contacting end, the spring member having:

(i) an unlocked condition in which, when a disk cartridge is positioned in said one of the cartridge slots, the cartridge contacting end is deflectable away from the disk cartridge to permit sliding of the disk cartridge within the slot, and (ii) a locked condition in which the cartridge contacting end is constrained from deflecting away from a disk cartridge positioned in said one of the cartridge slots to constrain the disk cartridge between the spring member and the second interior side; and (d) locking means for locking the spring member in the locked condition.

2. The cartridge magazine of claim 1 wherein:

the locking means comprises a cartridge lock having a blocking portion, the cartridge lock connected to the first side member and selectively slidable between a locking position, in which the blocking portion is positioned adjacent to the cartridge contacting end to block deflection of the spring member out of the locked condition, and an unlocking position in which the blocking portion is sufficiently spaced from the cartridge contacting end to permit deflection of the spring member in a direction away from the second side member; and the magazine further comprises an actuating means for sliding the cartridge lock between the locking and unlocking positions.

3. A disk cartridge magazine comprising:

(a) a housing having a first wall and a second wall connected in spaced relationship to define a cartridge storage chamber therebetween;

(b) a plurality of cartridge separators mounted to at least one of the walls to form a plurality of cartridge slots; and (c) a plurality of spring members, each connected to the first wall adjacent to a respective one of the cartridge slots and each having a cartridge contacting end extending partially into the chamber such that, when a disk cartridge is positioned in one of the cartridge slots, the disk cartridge is clamped between at least one of the spring members and the second wall, each cartridge contacting end deflectable away from the chamber upon application of pressure against the cartridge contacting end, each of the spring members having:

(i) an unlocked condition in which, when a disk cartridge is positioned in a corresponding one of the cartridge slots, the corresponding cartridge contacting end contacts the disk cartridge to provide detent holding but is deflectable away from the disk cartridge to permit sliding of the disk cartridge within the slot, and (ii) a locked condition in which the cartridge contacting end is constrained from deflecting away from a disk cartridge positioned in said one of the cartridge slots to constrain the disk cartridge between the cartridge contacting end and one of the walls; and the magazine further comprises locking means for locking the spring members in the locked condition.

4. The cartridge magazine of claim 3 wherein:

the locking means comprises a cartridge lock having a blocking portion, the cartridge lock connected to the first wall and selectively slidable between (i) a locking position, in which the cartridge contacting end of at least one of the spring members on the first wall is positioned between the blocking portion and the storage chamber to prevent deflection of the spring member out of the locked condition, and (ii) an unlocking position in which the blocking portion is sufficiently spaced from the cartridge contacting end to permit deflection of the spring member away from the storage chamber; and the apparatus further comprises actuating means for sliding the cartridge lock between the locking and unlocking positions.

5. The cartridge magazine of claim 4 wherein the blocking portion of the cartridge lock is sized to limit deflection of the spring member in the unlocked condition to a predetermined amount.

6. A disk cartridge magazine comprising:

(a) a housing having a first wall and a second wall connected in spaced relationship to define a cartridge storage chamber therebetween;

(b) a plurality of cartridge separators mounted to at least one of the walls to form a plurality of cartridge slots; and (c) a plurality of integral spring members formed in the first and second walls, each adjacent to a respective one of the cartridge slots and each having a cartridge contacting end extending partially into the chamber such that, when a disk cartridge is positioned in one of the cartridge slots, the disk cartridge is clamped between a spring member from the first wall and a spring member from the second wall, each cartridge contacting end being deflectable away from the chamber upon application of pressure to the cartridge contacting end, each spring member having (i) an unlocked condition in which, when a disk cartridge is positioned in a corresponding one of the cartridge slots, the corresponding cartridge contacting end contacts the disk cartridge to provide detent holding of the cartridge but is deflectable away from the disk cartridge to permit sliding of the disk cartridge within the slot, and (ii) a locked condition in which the cartridge contacting end is constrained from deflecting away from a disk cartridge positioned in said one of the cartridge slots to constrain the disk cartridge between the cartridge contacting end and a cartridge contacting end at an opposite side of the cartridge slot; and (d) locking means for locking the spring members in the locked condition.

7. The cartridge magazine of claim 6 wherein:

the locking means comprises a first cartridge lock having a blocking portion, the cartridge lock connected to the first wall and selectively slidable between (i) a locking position, in which the cartridge contacting ends of the spring members on the first wall are positioned between the blocking portion and the storage chamber to prevent deflection of the spring members out of the locked condition, and (ii) an unlocking position in which the blocking portion is sufficiently spaced from the cartridge contacting end to permit deflection of the spring members away from the storage chamber; and the apparatus further comprises actuating means for sliding the first cartridge lock between the locking and unlocking positions.

8. The cartridge magazine of claim 7 wherein:

the locking means further comprises a second cartridge lock having a blocking portion, the second cartridge lock connected to the second wall and selectively slidable between (i) a locking position, in which the cartridge contacting ends of the spring members on the second wall are positioned between the blocking portion and the storage chamber to prevent deflection of the spring members out of the locked condition, and (ii) an unlocking position in which the blocking portion is sufficiently spaced from the cartridge contacting end to permit deflection of the spring members away from the storage chamber; and the actuating means is further for sliding the second cartridge lock between the locking and unlocking positions.

9. A disk cartridge magazine for holding a plurality of disk cartridges, the magazine sized and shaped for installation into a data retrieval device having a chamber and walls lining the chamber, the magazine comprising:

(a) a frame having a first side member and a second side member connected to the first side member in spaced relationship, said side members having respective first and second interior sides, each of which faces the other of the first and second interior sides;

(b) a plurality of cartridge separators connected to the frame and positioned between the first and second side members to form a plurality of cartridge slots; and (c) a spring member connected to the first interior side and having a cartridge contacting end adjacent to at least one of the cartridge slots and extending towards the second interior side such that, when a disk cartridge is positioned in said one of the cartridge slots, the disk cartridge is retained between the cartridge contacting end of the spring member and the second interior side, the cartridge contacting end being deflectable in a direction away from the second interior side upon application of pressure against the cartridge contacting end, the spring member having:

(i) an unlocked condition in which, when a disk cartridge is positioned in said one of the cartridge slots, the cartridge contacting end is deflectable away from the disk cartridge to permit sliding of the disk cartridge within the slot, and (ii) a locked condition in which the cartridge contacting end is constrained from deflecting away from a disk cartridge positioned in said one of the cartridge slots to constrain the disk cartridge between the spring member and the second interior side;

(d) a cartridge lock having a blocking portion, the cartridge lock connected to the first side member and selectively slidable between a locking position, in which the blocking portion is positioned adjacent to the cartridge contacting end to block deflection of the spring member out of the locked condition, and an unlocking position in which the blocking portion is sufficiently spaced from the cartridge contacting end to permit deflection of the spring member in a direction away from the second side member, the cartridge lock having a catch surface exposed at an exterior side of the first side member; and (e) a tang protruding from a wall inside the data retrieval device chamber, the tang engageable with the catch surface during installation of the magazine into the data retrieval device to slide the cartridge lock from the locking to the unlocking position.

10. The cartridge magazine of claim 9 wherein the actuating means further comprises:

a biasing spring having a first end supported by the first side member and a second end positioned against the cartridge lock to bias the cartridge lock in the locking position.

11. The cartridge magazine of claim 9 wherein the actuating means further comprises a manual release tab connected to the first side member and operatively associated with the cartridge lock, the manual release tab manually moveable from a first position in which the cartridge lock is in the locking position and a second position in which the manual release tab slides the cartridge lock to the unlocking position.

12. A disk cartridge magazine for holding a plurality of disk cartridges comprising:

(a) a frame having a first side member and a second side member connected to the first side member in spaced relationship, said side members having respective first and second interior sides, each of which faces the other of the first and second interior sides;

(b) a plurality of cartridge separators connected to the frame and positioned between the first and second side members to form a plurality of cartridge slots; and (c) a spring member connected to the first interior side and having a cartridge contacting end adjacent to at least one of the cartridge slots and extending towards the second interior side such that, when a disk cartridge is positioned in said one of the cartridge slots, the disk cartridge is retained between the cartridge contacting end of the spring member and the second interior side, the cartridge contacting end being deflectable in a direction away from the second interior side upon application of pressure against the cartridge contacting end, the spring member having:

(i) an unlocked condition in which, when a disk cartridge is positioned in said one of the cartridge slots, the cartridge contacting end is deflectable away from the disk cartridge to permit sliding of the disk cartridge within the slot, and (ii) a locked condition in which the cartridge contacting end is constrained from deflecting away from a disk cartridge positioned in said one of the cartridge slots to constrain the disk cartridge between the spring member and the second interior side;

(d) a cartridge lock having a blocking portion, the cartridge lock connected to the first side member and selectively slidable between a locking position, in which the blocking portion is positioned adjacent to the cartridge contacting end to block deflection of the spring member out of the locked condition, and an unlocking position in which the blocking portion is sufficiently spaced from the cartridge contacting end to permit deflection of the spring member in a direction away from the second side member, the blocking portion sized to limit deflection of the spring member in the unlocked condition; and (e) actuating means for sliding the cartridge lock between the locking and unlocking positions.

13. A disk cartridge magazine sized and shaped for installation into a data retrieval device having a chamber and walls lining the chamber, the magazine comprising:

(a) a housing having a first wall and a second wall connected in spaced relationship to define a cartridge storage chamber therebetween;

(b) a plurality of cartridge separators mounted to at least one of the walls to form a plurality of cartridge slots; and (c) a plurality of spring members, each connected to the first wall adjacent to a respective one of the cartridge slots and each having a cartridge contacting end extending partially into the chamber such that, when a disk cartridge is positioned in one of the cartridge slots, the disk cartridge is retained between at least one of the spring members and the second wall, each cartridge contacting end deflectable away from the chamber upon application of pressure against it, each of the spring members having:

(i) an unlocked condition in which, when a disk cartridge is positioned in a corresponding one of the cartridge slots, the corresponding cartridge contacting end contacts the disk cartridge to provide detent holding but is deflectable away from the disk cartridge to permit sliding of the disk cartridge within the slot, and (ii) a locked condition in which the cartridge contacting end is constrained from deflecting away from a disk cartridge positioned in said one of the cartridge slots to constrain the disk cartridge between the cartridge contacting end and one of the walls;

(d) a cartridge lock having a blocking portion, the cartridge lock connected to the first wall and having a catch surface exposed at an exterior side of the first wall, the cartridge lock selectively slidable between
  (i) a locking position, in which the cartridge contacting end of at least one of the spring members on the first wall is positioned between the blocking portion and the storage chamber to prevent deflection of the spring member out of the locked condition, and
  (ii) an unlocking position in which the blocking portion is sufficiently spaced from the cartridge contacting end to permit deflection of the spring member away from the storage chamber; and (e) a tang protruding from a wall inside the data retrieval device chamber, the tang engageable with the catch surface during installation of the magazine into the data retrieval device to slide the cartridge lock from the locking to the unlocking position.

14. The cartridge magazine of claim 13 wherein the actuating means further includes:

a biasing spring having a first end supported by the first side wall and a second end positioned against the cartridge lock to bias the cartridge lock in the locking position.

15. The cartridge magazine of claim 13 wherein the actuating means further includes a manual release tab connected to the first wall and operatively associated with the cartridge lock, the manual release tab manually moveable from a first position in which the cartridge lock is in the locking position and a second position in which the manual release tab slides the cartridge lock to the unlocking position.

16. A disk cartridge magazine of the type for installation into a data retrieval device having a chamber and walls lining the chamber, the magazine comprising:

(a) a housing having a first wall and a second wall connected in spaced relationship to define a cartridge storage chamber therebetween;

(b) a plurality of cartridge separators mounted to at least one of the walls to form a plurality of cartridge slots; and (c) a plurality of integral spring members formed in the first and second walls, each adjacent to a respective one of the cartridge slots and each having a cartridge contacting end extending partially into the chamber such that, when a disk cartridge is positioned in one of the cartridge slots, the disk cartridge is clamped between a spring member from the first wall and a spring member from the second wall, each cartridge contacting end being deflectable away from the chamber upon application of pressure against it, each spring member having:
  (i) an unlocked condition in which, when a disk cartridge is positioned in a corresponding one of the cartridge slots, the corresponding cartridge contacting end contacts the disk cartridge to provide detent holding of the cartridge but is deflectable away from the disk cartridge to permit sliding of the disk cartridge within the slot, and
  (ii) a locked condition in which the cartridge contacting end is constrained from deflecting away from a disk cartridge positioned in said one of the cartridge slots to constrain the disk cartridge between the cartridge contacting end and a cartridge contacting end at an opposite side of the cartridge slot; and (d) a first cartridge lock having a blocking portion, the cartridge lock connected to the first wall and including a catch surface exposed at an exterior side of the corresponding wall of the magazine, the cartridge lock selectively slidable between
  (i) a locking position, in which the cartridge contacting ends of the spring members on the first wall are positioned between the blocking portion and the storage chamber to prevent deflection of the spring members out of the locked condition, and
  (ii) an unlocking position in which the blocking portion is sufficiently spaced from the cartridge contacting end to permit deflection of the spring members away from the storage chamber; and (e) a pair of tangs each protruding from a wall inside the data retrieval device chamber, each tang engageable with one of the catch surfaces during installation of the magazine into the data retrieval device to slide the corresponding cartridge lock from the locking to the unlocking position.

17. The cartridge magazine of claim 16 wherein the actuating means further comprises:

a pair of biasing springs, each having a first end supported by one of the walls and a second end positioned against the corresponding cartridge lock to bias the cartridge lock in the locking position.

18. The cartridge magazine of claim 16 wherein the actuating means further comprises a pair of manual release tabs, each connected to one of the side walls and operatively associated with a corresponding cartridge lock, each manual release tab manually moveable from a first position in which the cartridge lock is in the locking position and a second position in which the manual release tab slides the corresponding cartridge lock to the unlocking position.

19. A disk cartridge magazine comprising:

(a) a housing having a first wall and a second wall connected in spaced relationship to define a cartridge storage chamber therebetween;

(b) a plurality of cartridge separators mounted to at least one of the walls to form a plurality of cartridge slots; and (c) a plurality of integral spring members formed in the first and second walls, each adjacent to a respective one of the cartridge slots and each having a cartridge contacting end extending partially into the chamber such that, when a disk cartridge is positioned in one of the cartridge slots, the disk cartridge is clamped between a spring member from the first wall and a spring member from the second wall, each cartridge contacting end deflectable away from the chamber upon application of pressure against it, each spring member having:
  (i) an unlocked condition in which, when a disk cartridge is positioned in a corresponding one of the cartridge slots, the corresponding cartridge contacting end contacts the disk cartridge to provide detent holding of the cartridge but is deflectable away from the disk cartridge to permit sliding of the disk cartridge within the slot, and
  (ii) a locked condition in which the cartridge contacting end is constrained from deflecting away from a disk cartridge positioned in said one of the cartridge slots to constrain the disk cartridge between the cartridge contacting end and a cartridge contacting end at an opposite side of the cartridge slot; and (d) a first cartridge lock having a blocking portion, the cartridge lock connected to the first wall and selectively slidable between (i) a locking position, in which the cartridge contacting ends of the spring members on the first wall are positioned between the blocking portion and the storage chamber to prevent deflection of the spring members out of the locked condition, the blocking portion being sized to limit the amount of deflection of the corresponding spring members in the unlocked condition, and (ii) an unlocking position in which the blocking portion is sufficiently spaced from the cartridge contacting end to permit deflection of the spring members away from the storage chamber; and (e) actuating means for sliding the first cartridge lock between the sliding and unlocking positions.

* * * * *